US012626852B2

(12) United States Patent
Yoshioka et al.

(10) Patent No.: US 12,626,852 B2
(45) Date of Patent: May 12, 2026

(54) INDUCTOR COMPONENT

(71) Applicant: Murata Manufacturing Co., Ltd., Kyoto-fu (JP)

(72) Inventors: Yoshimasa Yoshioka, Nagaokakyo (JP); Ryuichiro Tominaga, Nagaokakyo (JP); Keisuke Kunimori, Nagaokakyo (JP); Yuuki Kawakami, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 903 days.

(21) Appl. No.: 17/399,980

(22) Filed: Aug. 11, 2021

(65) Prior Publication Data

US 2022/0068546 A1 Mar. 3, 2022

(30) Foreign Application Priority Data

Aug. 26, 2020 (JP) ................................ 2020-142632

(51) Int. Cl.

*H01F 27/28* (2006.01)
*H01F 17/00* (2006.01)

(Continued)

(52) U.S. Cl.

CPC ..... *H01F 27/2804* (2013.01); *H01F 17/0006* (2013.01); *H01F 17/02* (2013.01);

(Continued)

(58) Field of Classification Search

CPC .. H01F 27/2804; H01F 17/0006; H01F 17/02; H01F 27/292; H01F 27/327;

(Continued)

(56) References Cited

U.S. PATENT DOCUMENTS

2010/0259344 A1* 10/2010 Nosaka ................ H03H 7/1783 333/219.1
2012/0119863 A1* 5/2012 Wu ..................... H01F 17/0013 29/832

(Continued)

FOREIGN PATENT DOCUMENTS

CN 101953069 A 1/2011
CN 110942904 A 3/2020

(Continued)

*Primary Examiner* — Shawki S Ismail
*Assistant Examiner* — Kazi S Hossain
(74) *Attorney, Agent, or Firm* — Studebaker Brackett PLLC

(57) ABSTRACT

An inductor component includes a base body having a main surface, an inductor wiring extending in parallel to the main surface in the base body, a first vertical wiring, connected to a first end of the inductor wiring, that is exposed through the main surface, and a second vertical wiring, connected to a second end of the inductor wiring, that is exposed through the main surface. The base body has an upper magnetic layer disposed closer to the main surface than the inductor wiring. The first vertical wiring and the second vertical wiring have columnar shapes extending in a thickness direction while penetrating the upper magnetic layer. The dimension in the thickness direction of the penetration portion, which penetrates the upper magnetic layer, of the first vertical wiring is five times or more the maximum dimension in the thickness direction of the inductor wiring.

20 Claims, 17 Drawing Sheets

(51) Int. Cl.
*H01F 17/02* (2006.01)
*H01F 27/29* (2006.01)
*H01F 27/32* (2006.01)
*H01F 41/04* (2006.01)

(52) U.S. Cl.
CPC ......... *H01F 27/292* (2013.01); *H01F 27/327* (2013.01); *H01F 2017/0066* (2013.01); *H01F 41/041* (2013.01)

(58) Field of Classification Search
CPC ........... H01F 41/041; H01F 2017/0066; H01F 2017/048; H01F 17/04
USPC .......................................... 336/200, 232, 198
See application file for complete search history.

(56) References Cited

U.S. PATENT DOCUMENTS

| | | | | |
|---|---|---|---|---|
| 2012/0299666 | A1* | 11/2012 | Nosaka | H03H 7/1783 333/175 |
| 2017/0098997 | A1* | 4/2017 | Hamada | G06F 1/1635 |
| 2018/0075965 | A1* | 3/2018 | Yoshioka | H01F 27/2823 |
| 2019/0244743 | A1* | 8/2019 | Hirai | H01F 41/12 |
| 2020/0098506 | A1* | 3/2020 | Hamada | H01F 27/32 |

FOREIGN PATENT DOCUMENTS

| | | | |
|---|---|---|---|
| JP | 2000165171 | A * | 6/2000 |
| JP | 6024243 | B2 | 11/2016 |
| JP | 2019-121780 | A | 7/2019 |
| JP | 2020-053483 | A | 4/2020 |
| WO | 2009/090917 | A1 | 7/2009 |

* cited by examiner

INDUCTOR COMPONENT

CROSS-REFERENCE TO RELATED APPLICATION

This application claims benefit of priority to Japanese Patent Application No. 2020-142632, filed Aug. 26, 2020, the entire content of which is incorporated herein by reference.

BACKGROUND

Technical Field

The present disclosure relates to an inductor component.

Background Art

The inductor component described in Japanese Patent No. 6024243 has a base body with a main surface. A first inductor wiring and a second inductor wiring are disposed in the base body. The first inductor wiring and the second inductor wiring extend in parallel to the main surface. In addition, the first inductor wiring and the second inductor wiring extend spirally. The layer of the first inductor wiring and the layer of the second inductor wiring are disposed in the direction orthogonal to the main surface.

SUMMARY

In an inductor component such as the one described in Japanese Patent No. 6024243, a second inductor wiring is present in addition to a first inductor wiring in the base body. When the wiring length of the second inductor wiring is long, if the external shape of the inductor component is the same, the ratio of the volume of the magnetic material in the base body to the volume of the inductor component becomes smaller. Accordingly, the inductance of the inductor component is not as high as expected even though the second inductor wiring is provided in addition to the first inductor wiring, thereby reducing the inductance acquisition efficiency.

According to preferred embodiments of the present disclosure, there is provided an inductor component including a base body having a main surface; an inductor wiring extending in parallel to the main surface in the base body; a first vertical wiring connected to a first end of the inductor wiring, the first vertical wiring being exposed through the main surface; and a second vertical wiring connected to a second end of the inductor wiring, the second vertical wiring being exposed through the main surface. The base body has a magnetic layer disposed closer to the main surface than the inductor wiring. The first vertical wiring and the second vertical wiring have columnar shapes extending in a thickness direction while penetrating the magnetic layer, the thickness direction being orthogonal to the main surface. A dimension in the thickness direction of a penetration portion is five times or more a maximum dimension in the thickness direction of the inductor wiring, the penetration portion being a portion of the first vertical wiring penetrating the magnetic layer.

In the structure described above, the dimension in the thickness direction of the penetration portion of the first vertical wiring has a reasonable size as compared with the dimension in the thickness direction of the inductor wiring. By increasing the dimensions in the thickness direction of the first vertical wiring so as to actively configure the first vertical wiring as a wiring that contributes to inductance as described above, the inductance can be improved. Meanwhile, since the first vertical wiring has a columnar shape extending in the thickness direction and not in parallel to the main surface of the base body, it is possible to suppress the volume of the magnetic layer from becoming excessively small due to the presence of the first vertical wiring. As a result, the occurrence of a situation in which an expected inductance cannot be obtained due to reduction in the volume of the magnetic layer can be suppressed.

Reduction in the inductance acquisition efficiency can be suppressed.

Other features, elements, characteristics and advantages of the present disclosure will become more apparent from the following detailed description of preferred embodiments of the present disclosure with reference to the attached drawings.

DETAILED DESCRIPTION

Embodiments of an inductor component will be described below. It should be noted that the drawings may be illustrated with enlarged components for ease of understanding. The dimension ratios of components may differ from those of actual components or those of components in another figure.

First Embodiment

An inductor component according to a first embodiment will be described below.

Figure 1:
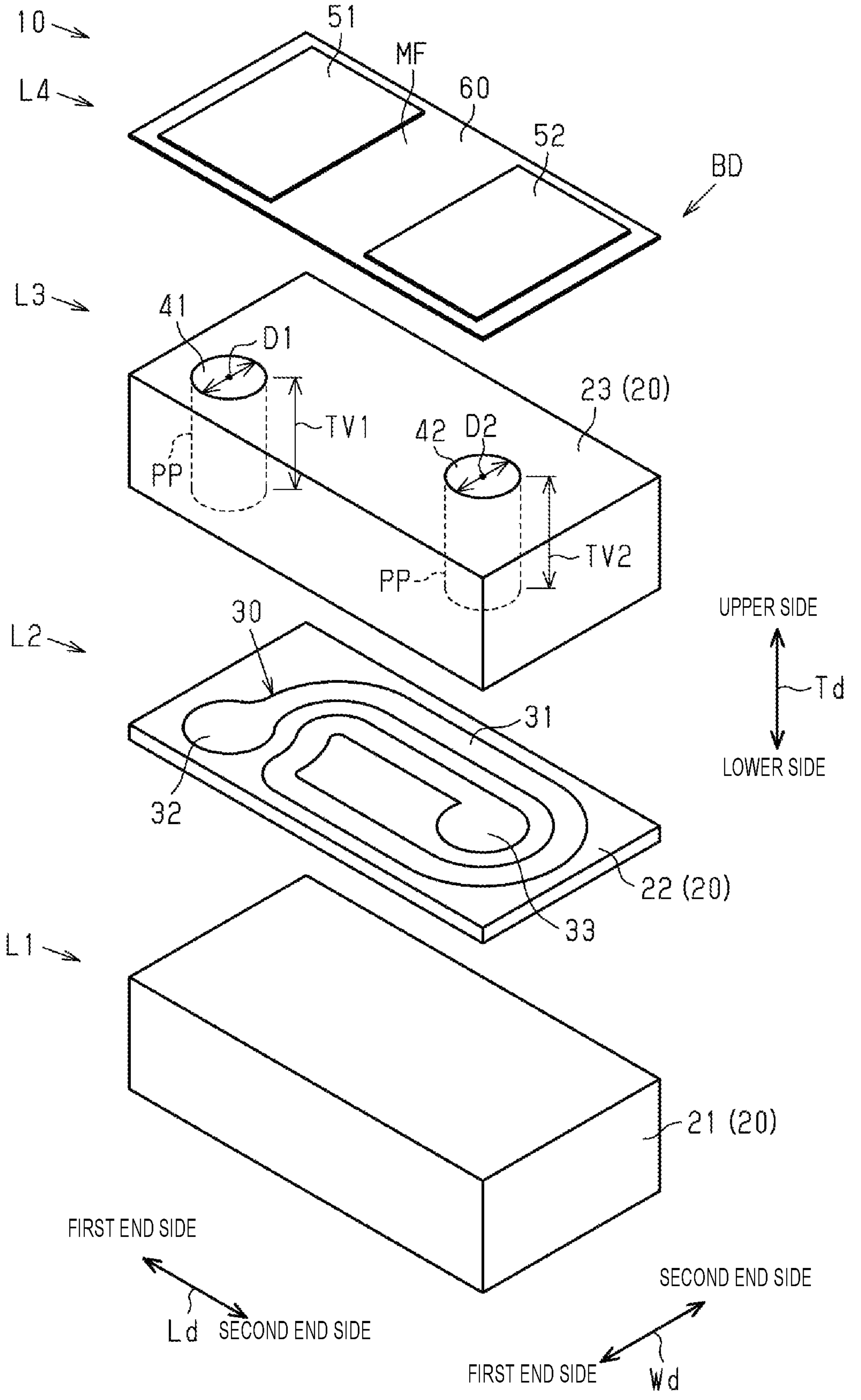
FIG. 1 is an exploded perspective view of an inductor component according to a first embodiment.

As illustrated in FIG. 1, an inductor component 10 includes a base body BD having a main surface MF. The inductor component 10 has a structure in which four layers are laminated in a thickness direction Td, which is orthogonal to the main surface MF, as a whole. In the following description, it is assumed that one side in the thickness direction Td is the upper side and the other side is the lower side.

A first layer L1 is disposed as the lowermost layer of the four layers. The first layer L1 is substantially rectangular when viewed in the thickness direction Td. The direction along the long side of this substantially rectangular shape is a longitudinal direction Ld and the direction along the short side is a lateral direction Wd.

The first layer L1 includes only a lower magnetic layer 21. The lower magnetic layer 21 is a mixture of resin and metal magnetic powder and is a magnetic material as a whole. In the embodiment, the dimension in the longitudinal direction Ld of the first layer L1 is about 600 μm, the dimension in the lateral direction Wd of the first layer L1 is about 300 μm, and the dimension in the thickness direction Td of the first layer L1 is about 220 μm.

A second layer L2 is laminated on the upper surface, which is the surface on the upper side in the thickness direction Td of the first layer L1. The second layer L2 is substantially rectangular when viewed in the thickness direction Td, which is the same as the first layer L1. The second layer L2 includes an inductor wiring 30 and an intermediate magnetic layer 22. The inductor wiring 30 is included only in the second layer L2. That is, the inductor wiring 30 is a single layer.

Figure 2:
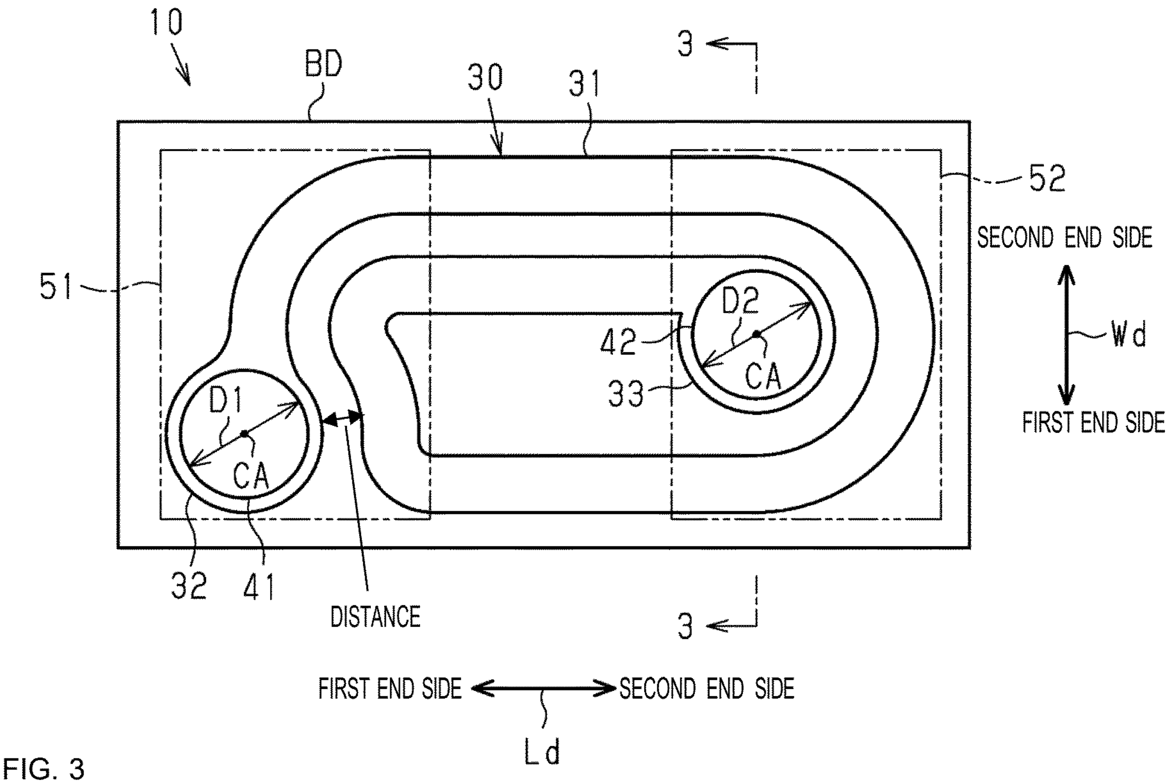
FIG. 2 is a transparent plan view of the inductor component according to the first embodiment.

As illustrated in FIG. 2, the inductor wiring 30 includes a wiring body 31, a first pad 32, and a second pad 33. The first pad 32 is substantially circular when viewed in the thickness direction Td. The diameter of the first pad 32 when viewed in the thickness direction Td is about one-third of the dimension in the lateral direction Wd of the second layer L2. The first pad 32 is disposed closer to the first end in the longitudinal direction Ld than the middle in the longitudinal direction Ld of the second layer L2. In addition, the first pad 32 is disposed closer to the first end in the lateral direction Wd than the middle in the lateral direction Wd of the second layer L2.

The first end of the wiring body 31 is connected to the side surface in the lateral direction Wd of the first pad 32 close to the second end. The wiring width of the wiring body 31 is smaller than the diameter of the first pad 32. When viewed from the upper side in the thickness direction Td, the wiring body 31 extends clockwise from the outer side portion to the inner side portion substantially spirally around the vicinity of the center of the second layer L2.

The second pad 33 is connected to the second end of the wiring body 31. The shape of the second pad 33 is substantially circular when viewed in the thickness direction Td, which is the same as that of the first pad 32. The second pad 33 is disposed closer to the second end in the longitudinal direction Ld than the middle in the longitudinal direction Ld of the second layer L2. In addition, the second pad 33 is disposed near the middle in the lateral direction Wd of the second layer L2.

The number of turns of the inductor wiring 30 is determined based on a virtual vector. The starting point of the virtual vector is disposed on the virtual center line that extends in the extension direction of the inductor wiring 30 through the middle of the wiring width of the inductor wiring 30. When viewed in the thickness direction Td, if the virtual vector is moved from the state in which the starting point of the inductor wiring 30 is disposed at one end to the other end of the virtual center line, the number of turns is defined as 1.0 turns when the rotation angle of the orientation of the virtual vector is 360 degrees. Accordingly, when the inductor wiring 30 is wound by, for example, 180 degrees, the number of turns is 0.5 turns. In the embodiment, the orientation of the virtual vector virtually disposed on the inductor wiring 30 is rotated by 450 degrees. Accordingly, the number of turns by which the inductor wiring 30 is wound is 1.25 turns in the embodiment.

In addition, the portion of the inductor wiring 30 from the first pad 32 to the 0.25 turns of the wiring body 31 and the portion of the inductor wiring 30 from the second pad 33 to 0.25 turns of the wiring body 31 extend in parallel to each other. The inter-wiring distance of the inductor wiring 30 is minimum between the inner side surface in the radial direction of the portion from the first pad 32 to 0.25 turns of the wiring body 31 and the outer side surface in the radial direction of the portion from the second pad 33 to 0.25 turns of the wiring body 31.

Figure 3:
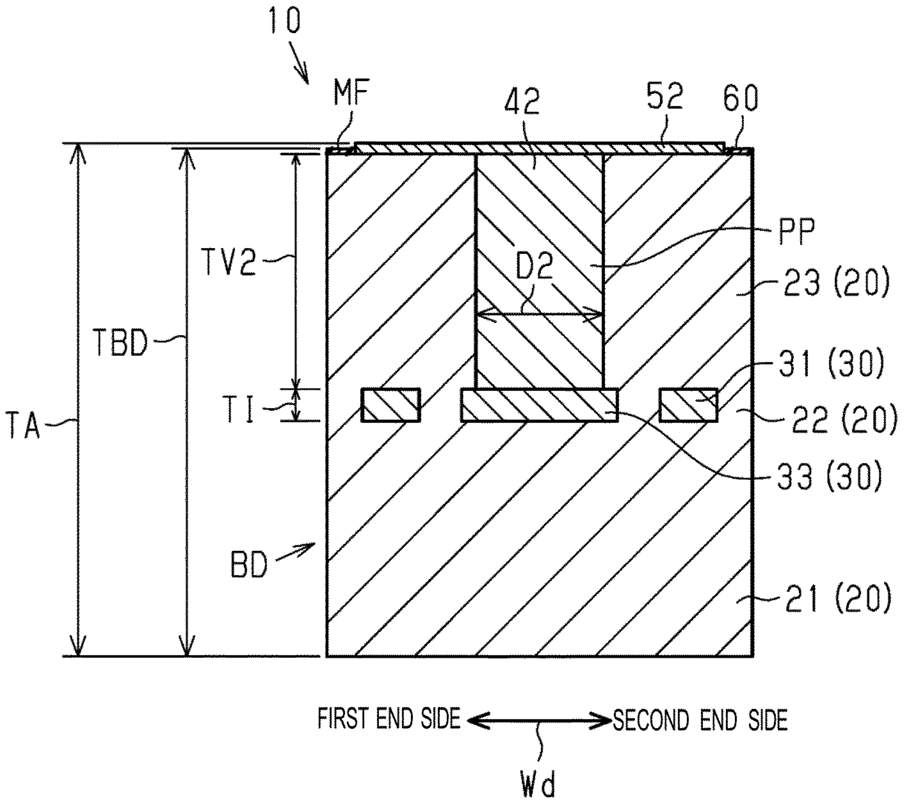
FIG. 3 is a sectional view of the inductor component taken along line 3-3 in FIG. 2.

The maximum dimension TI in the thickness direction Td of the inductor wiring 30 illustrated in FIG. 3 is not less than about 10 μm and not more than about 50 μm (i.e., from about 10 μm to about 50 μm). Specifically, in the embodiment, the maximum dimension TI in the thickness direction Td of the inductor wiring 30 is about 30 μm. In addition, the inductor wiring 30 is made of a conductive material. In the embodiment, the inductor wiring 30 has a composition of not less than about 99 wt % of copper and not less than about 0.1 wt % and not more than about 1.0 wt % (i.e., from about 0.1 wt % to about 1.0 wt %) of sulfur. That is, the inductor wiring 30 contains not less than about 99 wt % of copper.

As illustrated in FIG. 1, the portion of the second layer L2 excluding the inductor wiring 30 is the intermediate magnetic layer 22. The material of the intermediate magnetic layer 22 is the same as that of the lower magnetic layer 21. The dimension in the thickness direction Td of the intermediate magnetic layer 22 is the same as the maximum dimension TI in the thickness direction Td of the inductor wiring 30. The intermediate magnetic layer 22 is the second magnetic layer disposed in the same layer as the inductor wiring 30.

A third layer L3 is laminated on the upper surface, which is the surface on the upper side in the thickness direction Td of the second layer L2. The third layer L3 is substantially rectangular when viewed in the thickness direction Td, which is the same as the second layer L2. The third layer L3 includes a first vertical wiring 41, a second vertical wiring 42, and an upper magnetic layer 23.

The first vertical wiring 41 is directly connected to the upper surface of the first pad 32 of the inductor wiring 30 without intervention of any other layer. That is, the first vertical wiring 41 is connected to the first end of the inductor wiring 30. The material of the first vertical wiring 41 is a conductive material. In the embodiment, the first vertical wiring 41 has a composition of not less than about 99 wt % of copper. That is, the first vertical wiring 41 contains not less than about 99 wt % of copper.

The first vertical wiring 41 has a substantially cylindrical shape and the axial direction of the substantially cylindrical shape matches the thickness direction Td. That is, the lower surface of the first vertical wiring 41 is in direct contact with the inductor wiring 30. As illustrated in FIG. 2, the diameter of the first vertical wiring 41, which is substantially circular when viewed in the thickness direction Td, is slightly smaller than the diameter of the substantially circular first pad 32. In the embodiment, the diameter D1 of the first vertical wiring 41, which is substantially circular when viewed in the thickness direction Td, is about 100 μm. In addition, the dimension TV1 in the thickness direction Td of the first vertical wiring 41 illustrated in FIG. 1 is about 220 μm.

The second vertical wiring 42 is directly connected to the upper surface of the second pad 33 of the inductor wiring 30 without intervention of any other layer. That is, the second vertical wiring 42 is connected to the second end of the inductor wiring 30. The material of the second vertical wiring 42 is a conductive material. In the embodiment, the second vertical wiring 42 has a composition of not less than about 99 wt % of copper. That is, the second vertical wiring 42 contains not less than about 99 wt % of copper.

The second vertical wiring 42 has a substantially cylindrical shape and the axial direction of the substantially cylindrical shape matches the thickness direction Td. That is, the lower surface of the second vertical wiring 42 is in direct contact with the inductor wiring 30. As illustrated in FIG. 2, the diameter of the second vertical wiring 42, which is substantially circular when viewed in the thickness direction Td, is slightly smaller than the diameter of the substantially circular second pad 33. In the embodiment, the diameter D2 of the second vertical wiring 42, which is substantially circular when viewed in the thickness direction Td, is about 100 μm. In addition, as illustrated in FIG. 3, the dimension TV2 in the thickness direction Td of the second vertical wiring 42 is about 220 μm.

As illustrated in FIG. 1, the portion of the third layer L3 excluding the first vertical wiring 41 and the second vertical wiring 42 is the upper magnetic layer 23. Accordingly, the surfaces of the first vertical wiring 41 and the second vertical wiring 42 excluding the upper surface and the lower surface thereof are in contact with the upper magnetic layer 23. The material of the upper magnetic layer 23 is the same as that of the lower magnetic layer 21. The dimension in the thickness direction Td of the upper magnetic layer 23 is the same as the dimension TV1 in the thickness direction Td of the first vertical wiring 41 and the dimension TV2 in the thickness direction Td of the second vertical wiring 42.

That is, the first vertical wiring 41 and the second vertical wiring 42 extend in the thickness direction Td while penetrating the upper magnetic layer 23 in the thickness direction Td. In addition, in the embodiment, the entire first vertical wiring 41 and the entire second vertical wiring 42 are penetration portions PP that penetrate the upper magnetic layer 23. Accordingly, the dimension in the thickness direction Td of the penetration portion PP of the first vertical wiring 41 is the same as the dimension TV1 in the thickness direction Td of the first vertical wiring 41. Accordingly, the ratio of the dimension in the thickness direction Td of the penetration portion PP of the first vertical wiring 41 to the diameter D1, which is the width dimension in the direction orthogonal to the thickness direction Td of the first vertical wiring 41, is about 2.2. Similarly, the dimension in the thickness direction Td of the penetration portion PP of the second vertical wiring 42 is the same as the dimension TV2 in the thickness direction Td of the second vertical wiring 42. Accordingly, the ratio of the dimension in the thickness direction Td of the penetration portion PP of the second vertical wiring 42 to the diameter D2, which is the width dimension in the direction orthogonal to the thickness direction Td of the second vertical wiring 42, is about 2.2. The width dimension of each of the vertical wirings is the smallest dimension of the Feret's diameter in the direction parallel to the main surface MF. The Feret's diameter in the direction parallel to the main surface MF is the smallest dimension of the dimensions in the direction orthogonal to the thickness direction Td of the images generated when the individual vertical wirings are projected in the direction parallel to the main surface MF.

Furthermore, the dimension in the thickness direction Td of the penetration portion PP of the first vertical wiring 41 is about 7.3 times the dimension in the thickness direction Td of the inductor wiring 30. Similarly, the dimension in the thickness direction Td of the penetration portion PP of the second vertical wiring 42 is about 7.3 times the dimension in the thickness direction Td of the inductor wiring 30.

In addition, the lower magnetic layer 21, the intermediate magnetic layer 22, and the upper magnetic layer 23 described above constitute a magnetic layer 20. The upper magnetic layer 23 is disposed above the inductor wiring 30 and the upper magnetic layer 23 is the first magnetic layer. The interfaces between individual layers may be present or absent in the magnetic layer 20. In the embodiment, the lower magnetic layer 21 and the intermediate magnetic layer 22 are integrated with each other and no interface is present. In contrast, an interface is present between the intermediate magnetic layer 22 and the upper magnetic layer 23.

A fourth layer L4 is laminated on the upper surface, which is the surface on the upper side in the thickness direction Td of the third layer L3. The fourth layer L4 includes a first external terminal 51, a second external terminal 52, and an insulating layer 60.

As illustrated in FIG. 2, the first external terminal 51 is disposed in a range including the entire upper surface of the first vertical wiring 41 of the upper surface of the third layer L3. The first external terminal 51 has a substantially rectangular shape with a long side along the lateral direction Wd when viewed in the thickness direction Td. The dimensions of the sides of the first external terminal 51, which is substantially rectangular when viewed in the thickness direction Td, are larger than the diameter D1 of the first vertical wiring 41. Accordingly, the first external terminal 51 is disposed on the entire upper surface of the first vertical wiring 41 and part of the upper surface of the upper magnetic layer 23. The first external terminal 51 is disposed closer to the first end than the middle in the longitudinal direction Ld of the fourth layer L4. Although not illustrated, the first external terminal 51 has a three-layer structure containing copper, nickel, and gold. The dimension in the thickness direction Td of the first external terminal 51 is about 10 μm.

The second external terminal 52 is disposed in a range including the entire upper surface of the second vertical wiring 42 of the upper surface of the third layer L3. The second external terminal 52 has a substantially rectangular shape with a long side along the lateral direction Wd when viewed in the thickness direction Td. The dimensions of the sides of the second external terminal 52, which is substantially rectangular when viewed in the thickness direction Td, are larger than the diameter D2 of the second vertical wiring 42. Accordingly, the second external terminal 52 is disposed on the entire upper surface of the second vertical wiring 42 and part of the upper surface of the upper magnetic layer 23. The second external terminal 52 is disposed closer to the second end than the middle in the longitudinal direction Ld of the fourth layer L4. Although not illustrated, the second external terminal 52 has a three-layer structure containing copper, nickel, and gold. The dimension in the thickness direction Td of the second external terminal 52 is about 10 μm.

As illustrated in FIG. 1, the portion of the fourth layer L4 excluding the first external terminal 51 and the second external terminal 52 is the insulating layer 60. The insulating layer 60 has higher insulation than the magnetic layer 20. In the embodiment, the insulating layer 60 is a solder resist.

The dimension in the thickness direction Td of the insulating layer 60 illustrated in FIG. 3 is about 5 μm. Accordingly, as illustrated in FIG. 3, part of the first external terminal 51 and part of the second external terminal 52 project upward of the upper surface of the insulating layer 60 in the thickness direction Td. In the embodiment, the magnetic layer 20 and the insulating layer 60 constitute the base body BD. In addition, the upper surface of the insulating layer 60 of the base body BD is the main surface MF. Accordingly, as illustrated in FIG. 1, the inductor wiring 30 extends in parallel to the main surface MF. In addition, the insulating layer 60 does not cover the upper surfaces of the first vertical wiring 41 and the second vertical wiring 42. Accordingly, the upper surfaces of the first vertical wiring 41 and the second vertical wiring 42 are exposed through the main surface MF. It should be noted that the magnetic layer 20 and the insulating layer 60 that constitute the base body BD are shown transparent in FIG. 2. In addition, exposure through the main surface MF does not necessarily mean projection to the outside of the base body BD through the main surface MF and may be exposure through the main surface MF. For example, the upper surfaces of the first vertical wiring 41 and the second vertical wiring 42 are covered with members, that is, the individual external terminals in the embodiment, other than the base body BD and the upper surfaces are not exposed to the outside of the inductor component 10, but the upper surfaces are exposed through the main surface MF.

In addition, the dimension TA in the thickness direction Td of the inductor component 10 illustrated in FIG. 3 is the sum of the dimensions in the thickness direction Td of the first layer L1 to the fourth layer L4, and the dimension TA is about 480 μm in the embodiment. In addition, the dimension TBD in the thickness direction Td of the base body BD is smaller than the dimension in the thickness direction Td of the inductor component 10, and the dimension TBD is about 475 μm in the embodiment.

Next, the manufacturing method for the inductor component 10 according to the first embodiment will be described.

Figure 4:
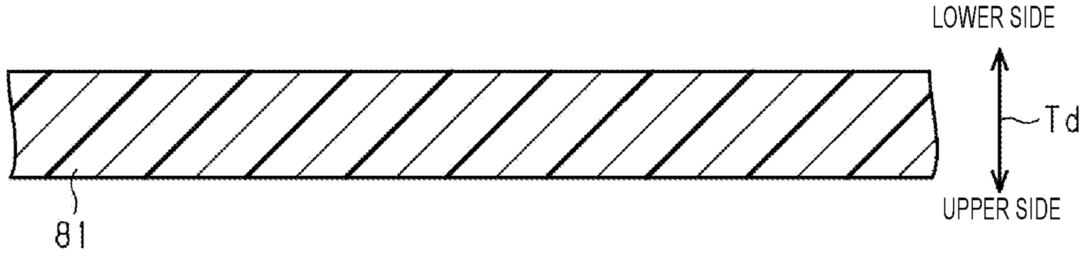
FIG. 4 is an explanatory diagram of a manufacturing method for the inductor component according to the first embodiment.

In manufacturing the inductor component 10, a base member preparation process is first performed. Specifically, a plate-like base member 81 as illustrated in FIG. 4 is prepared. The material of the base member 81 is ceramic. The base member 81 is substantially quadrangular when viewed in the thickness direction Td. The sides of the base member 81, which is substantially quadrangular when viewed in the thickness direction Td, are large enough to accommodate a plurality of inductor components 10. In the following description, the direction orthogonal to the plane direction of the base member 81 is assumed to be the thickness direction Td. The up and down in the thickness direction Td of FIGS. 4 to 12 for describing the manufacturing method are opposite to the up and down in the thickness direction Td of FIGS. 1 to 3.

Figure 5:
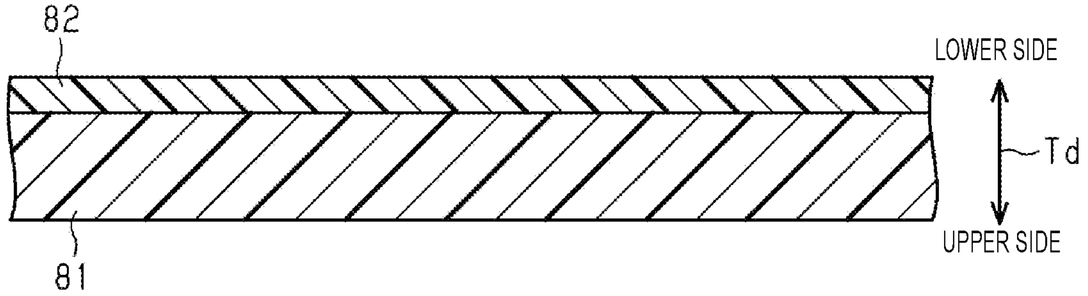
FIG. 5 is an explanatory diagram of the manufacturing method for the inductor component according to the first embodiment.

Next, as illustrated in FIG. 5, an adhesive layer 82 is pasted to the lower surface in the thickness direction Td of the base member 81, that is, the surface illustrated on the upper side in FIG. 5. In the embodiment, the adhesive layer 82 is a seal that can be peeled off from the base member 81 after being pasted. Furthermore, the surface of the adhesive layer 82 opposite to the base member 81 can also be adhered. That is, the surfaces on both sides in the thickness direction Td of the adhesive layer 82 are adhesive surfaces.

Figure 6:
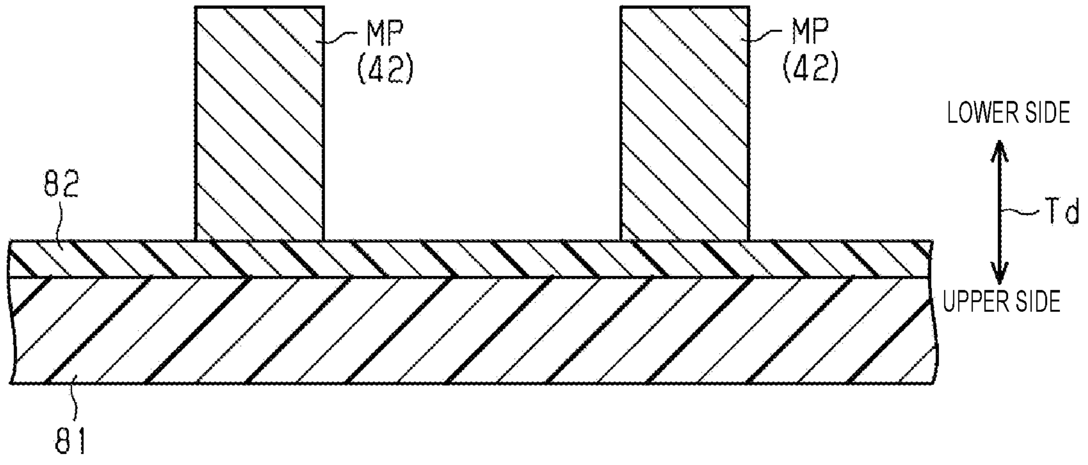
FIG. 6 is an exploratory diagram of the manufacturing method for the inductor component according to the first embodiment.

Next, as illustrated in FIG. 6, metal columnar members MP are adhered to the lower surface of the adhesive layer 82 as a vertical wiring forming process. The metal columnar members MP have a substantially cylindrical shape extending in a substantially linear shape. The metal columnar members MP are made of a conductive material. In the embodiment, the metal columnar members MP have a composition of not less than about 99 wt % of copper. The dimension in the thickness direction Td of the metal columnar members MP is about 250 μm. It should be noted that the metal columnar members MP constitute the first vertical wiring 41 and the second vertical wiring 42, as described later. Accordingly, the two metal columnar members MP per inductor component 10 are adhered to the lower surface of the adhesive layer 82.

Figure 7:
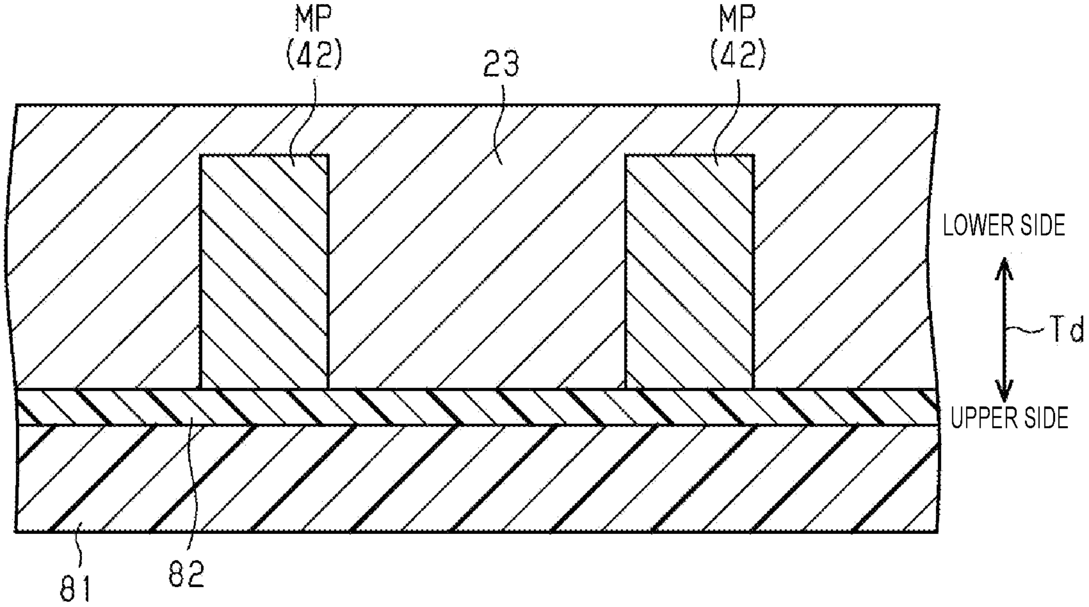
FIG. 7 is an explanatory diagram of the manufacturing method for the inductor component according to the first embodiment.

Next, a resin containing magnetic powder, which is the material of the upper magnetic layer 23, is applied as a first magnetic layer forming process. As illustrated in FIG. 7, the resin is applied so as to also cover the upper end face of the metal columnar member MP. Next, the upper magnetic layer 23 is formed by solidifying the resin containing magnetic powder using press work.

Figure 8:
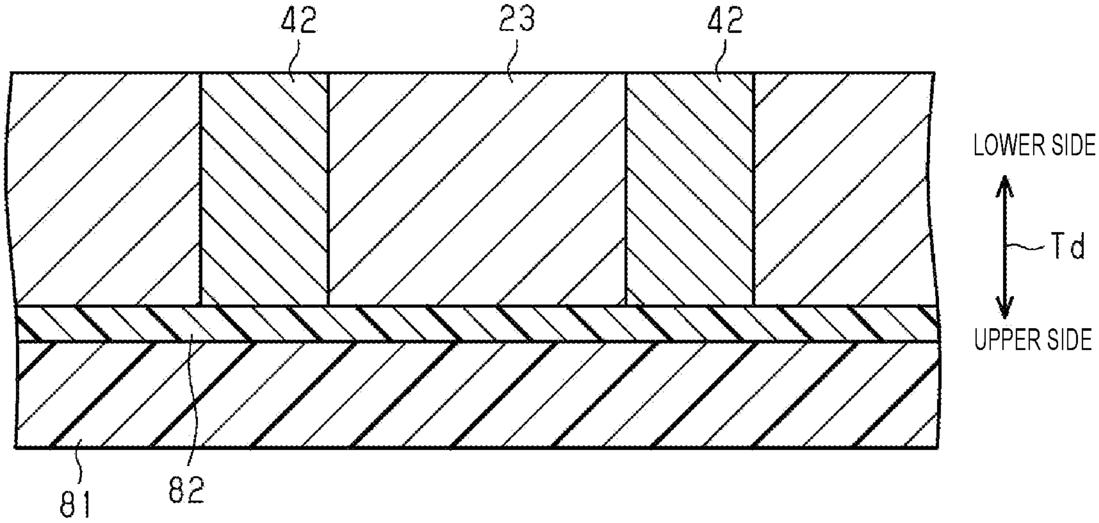
FIG. 8 is an explanatory diagram of the manufacturing method for the inductor component according to the first embodiment.

Next, as illustrated in FIG. 8, the lower portions of the first vertical wiring 41, the second vertical wiring 42, and the upper magnetic layer 23 are shaved as the vertical wiring forming process. Specifically, the lower portions are shaved from the lower side in the thickness direction Td until the dimensions in the thickness direction Td of the first vertical wiring 41, the second vertical wiring 42, and the upper magnetic layer 23 become about 220 μm. As a result, the lower surface of the first vertical wiring 41 and the lower surface of the second vertical wiring 42 are exposed through the lower surface of the upper magnetic layer 23. It should be noted that FIGS. 8 to 14 illustrate only the second vertical wiring 42 and do not illustrate the first vertical wiring 41.

Next, a seed layer forming process for forming a seed layer is performed. Specifically, copper seed layers are formed on the lower surface of the first vertical wiring 41, the lower surface of the second vertical wiring 42, and the lower surface of the upper magnetic layer 23 by sputtering. It should be noted that the seed layer is not illustrated because the layer is much thinner than other layers.

Figure 9:
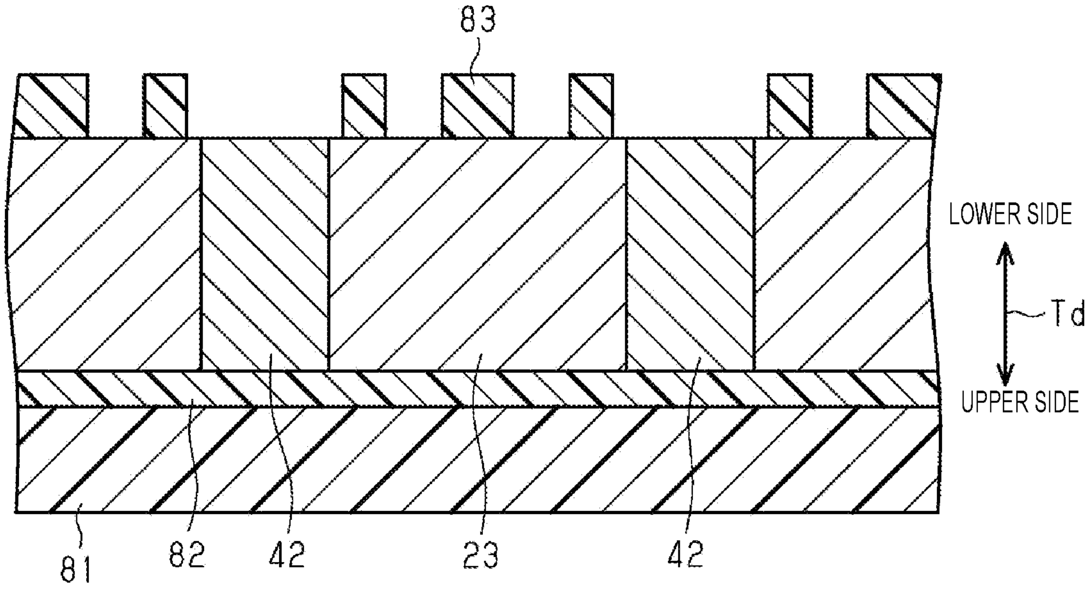
FIG. 9 is an explanatory diagram of the manufacturing method for the inductor component according to the first embodiment.

Next, a covering process is performed to form a covering portion 83 that covers the portion of the lower surface of the seed layer in which the inductor wiring 30 is not to be formed, as illustrated in FIG. 9. Specifically, a photosensitive dry film resist is first laminated on the entire lower surface of the seed layer. Next, the portion in which the inductor wiring 30 is not to be formed is exposed to solidify the portion. After that, the unsolidified portion of the laminated dry film resist is peeled off and removed with a chemical solution. As a result, the solidified portion of the laminated dry film resist is formed as the covering portion 83. In contrast, the seed layer is exposed through the portion of the laminated dry film resist that has been removed by the chemical solution and not covered with the covering portion 83. The dimension in the thickness direction Td of the covering portion 83 is slightly larger than the dimension in the thickness direction Td of the inductor wiring 30 of the inductor component 10 illustrated in FIG. 3.

Next, an inductor wiring work process is performed to form the inductor wiring 30 in the portion of the lower surface of the seed layer that is not covered with the covering portion 83 by electrolytic plating. Specifically, electrolytic copper plating is performed to cause copper to be grown from the portion of the seed layer that is not covered with the covering portion 83.

Figure 10:
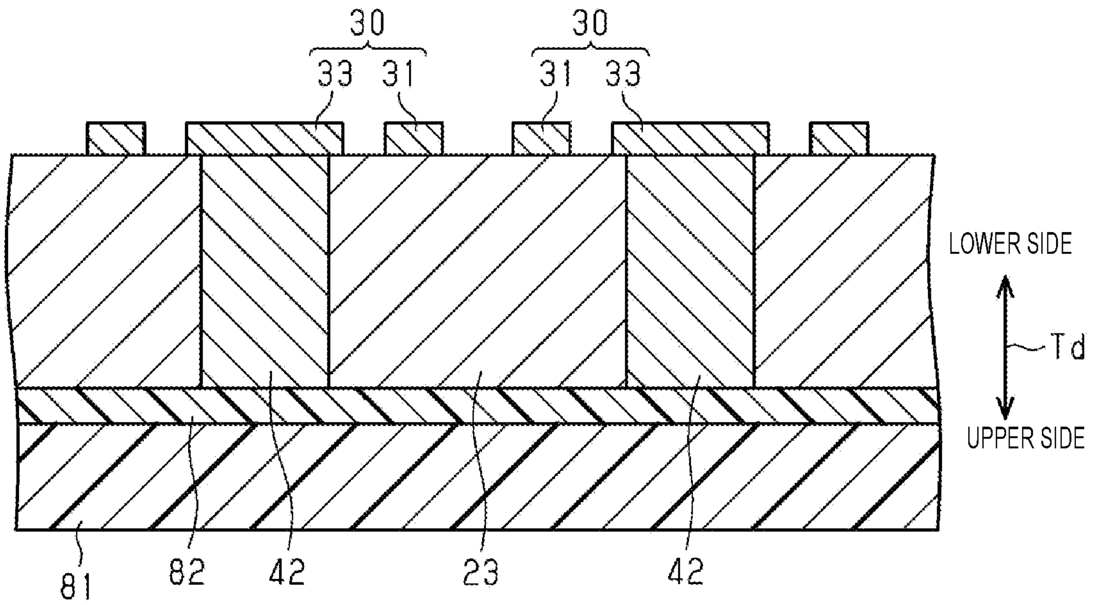
FIG. 10 is an explanatory diagram of the manufacturing method for the inductor component according to the first embodiment.

Next, a covering portion removal process for removing the covering portion 83 is performed, as illustrated in FIG. 10. Specifically, the covering portion 83 is peeled off and removed with a chemical solution and the covering portion 83 is peeled off from the base member 81 so that they are separated from each other.

Next, a seed layer etching process for etching the seed layer is performed. The seed layer exposed through the grown copper portion is removed by etching the seed layer. This forms the inductor wiring 30. That is, in the embodiment, the inductor wiring 30 is formed by a semi additive process (SAP).

Figure 11:
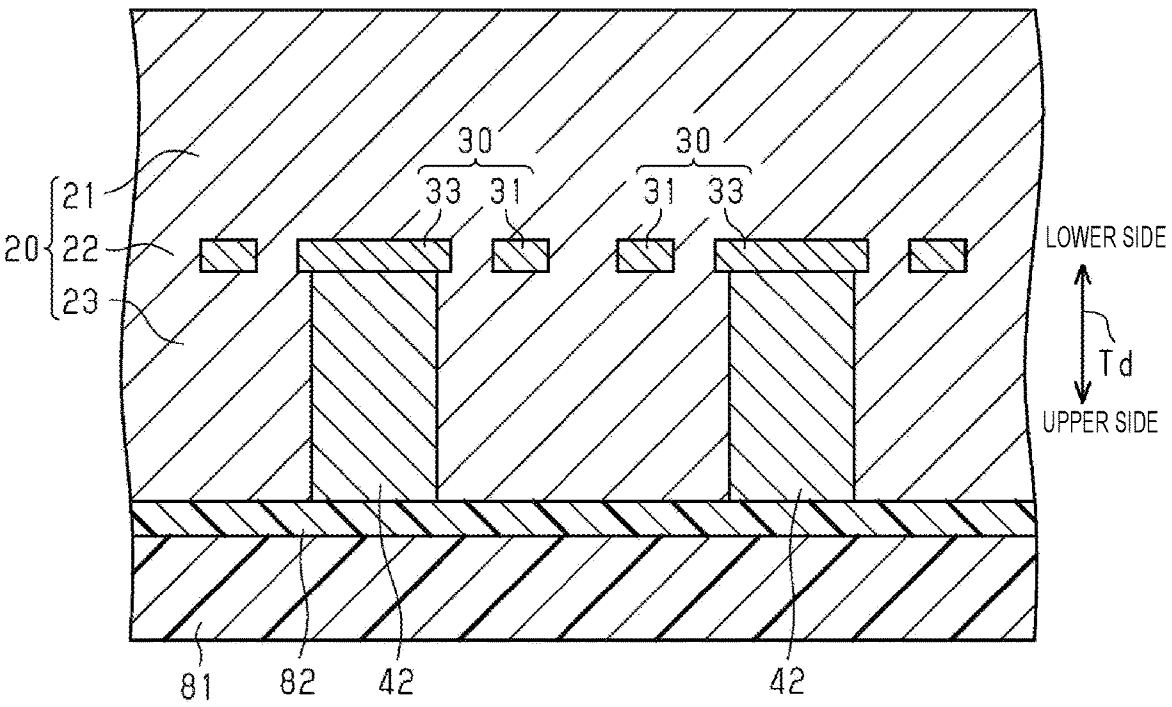
FIG. 11 is an explanatory diagram of the manufacturing method for the inductor component according to the first embodiment.

Next, a second magnetic layer work process is performed to laminate the lower magnetic layer 21 on the intermediate magnetic layer 22 as illustrated in FIG. 11. Specifically, a resin containing magnetic powder, which is a material of the magnetic layer 20, is first applied from the lower side of the inductor wiring 30. At this time, the resin containing magnetic powder is applied so as to cover not only the surface of the inductor wiring 30, but also the lower surface of the upper magnetic layer 23. Next, the intermediate magnetic layer 22 and the lower magnetic layer 21 are formed by solidifying the resin containing magnetic powder using press work. Then, the lower magnetic layer 21 is ground from the lower side so that the dimension in the thickness direction Td of the second magnetic layer becomes a desired dimension.

Figure 12:
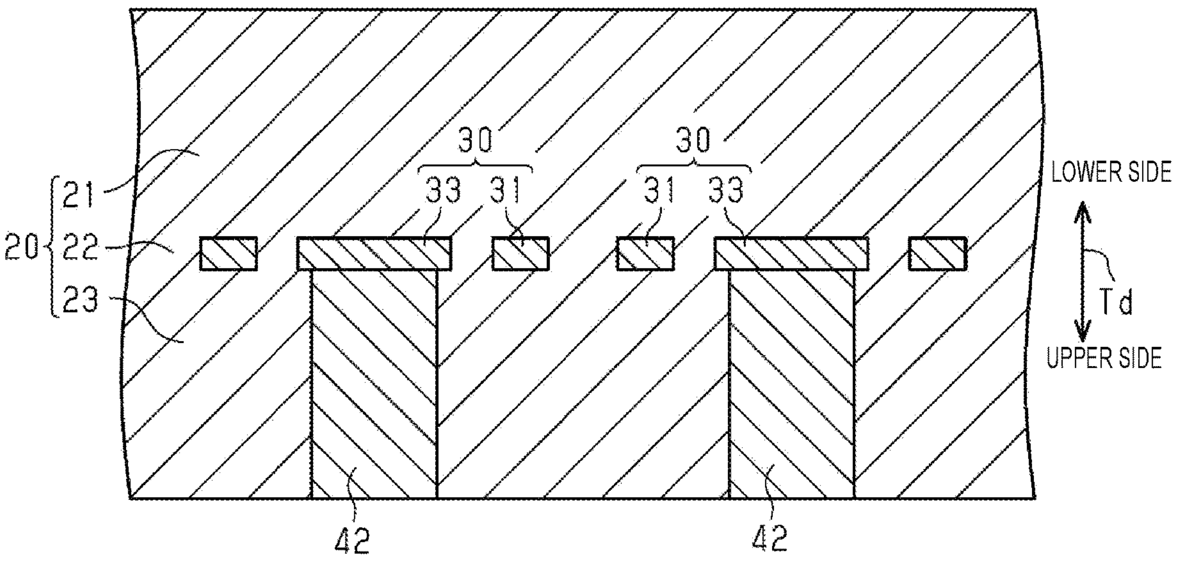
FIG. 12 is an explanatory diagram of the manufacturing method for the inductor component according to the first embodiment.

Next, a base member removal process is performed. Specifically, the base member 81 and the adhesive layer 82 are removed. As illustrated in FIG. 12, the adhesive layer 82 and the base member 81 are physically grasped and then separated so as to peel off the adhesive layer 82 from the upper surface of the upper magnetic layer 23. As a result, the upper surface of the first vertical wiring 41 and the upper surface of the second vertical wiring 42 are exposed through the upper surface of the upper magnetic layer 23. In addition, the first vertical wiring 41 and the second vertical wiring 42 penetrate the upper magnetic layer 23.

Figure 13:
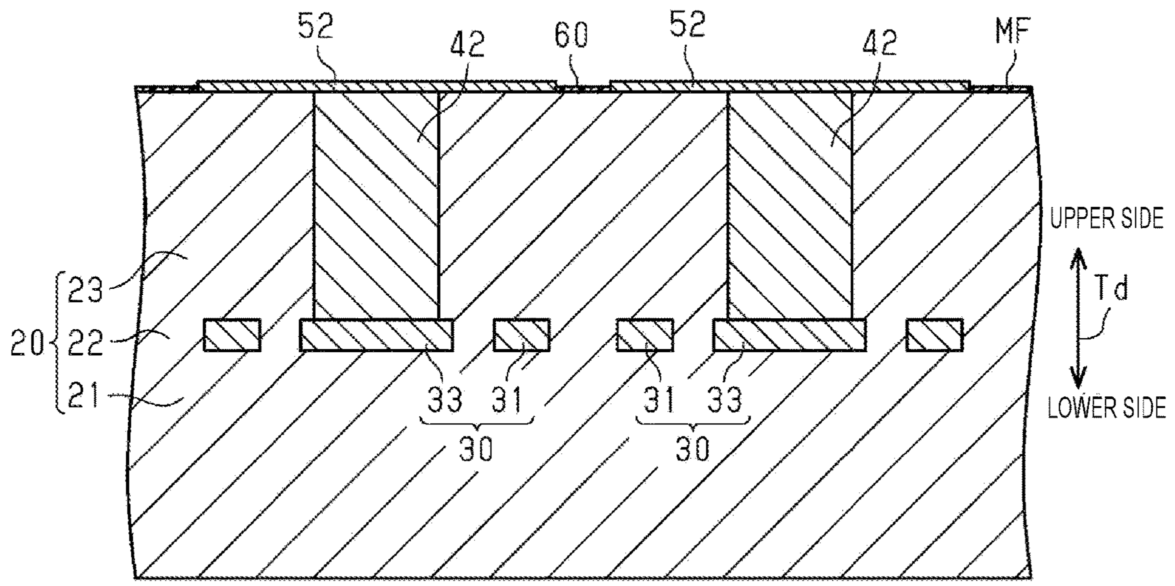
FIG. 13 is an explanatory diagram of the manufacturing method for the inductor component according to the first embodiment.

Next, after the base member removal process, an insulating layer work process is performed with the entire body turned upside down in the thickness direction Td, as illustrated in FIG. 13. Specifically, a solder resist that functions as the insulating layer 60 is patterned by photolithography in the portion of the upper surface of the upper magnetic layer 23 in which the external terminals are not to be formed. In the embodiment, the direction orthogonal to the upper surface of the insulating layer 60, that is, the main surface MF of the base body BD, is the thickness direction Td.

Next, as an external terminal forming process, the first external terminal 51 is formed in the range including the upper surface of the first vertical wiring 41, and the second external terminal 52 is formed in the range including the upper surface of the second vertical wiring 42. The first external terminal 51 and the second external terminal 52 are formed by electroless plating for copper, nickel, and gold. This forms the external terminals with a three-layer structure. It should be noted that FIGS. 13 and 14 illustrate the second external terminal 52 and do not illustrate the first external terminal 51.

Figure 14:
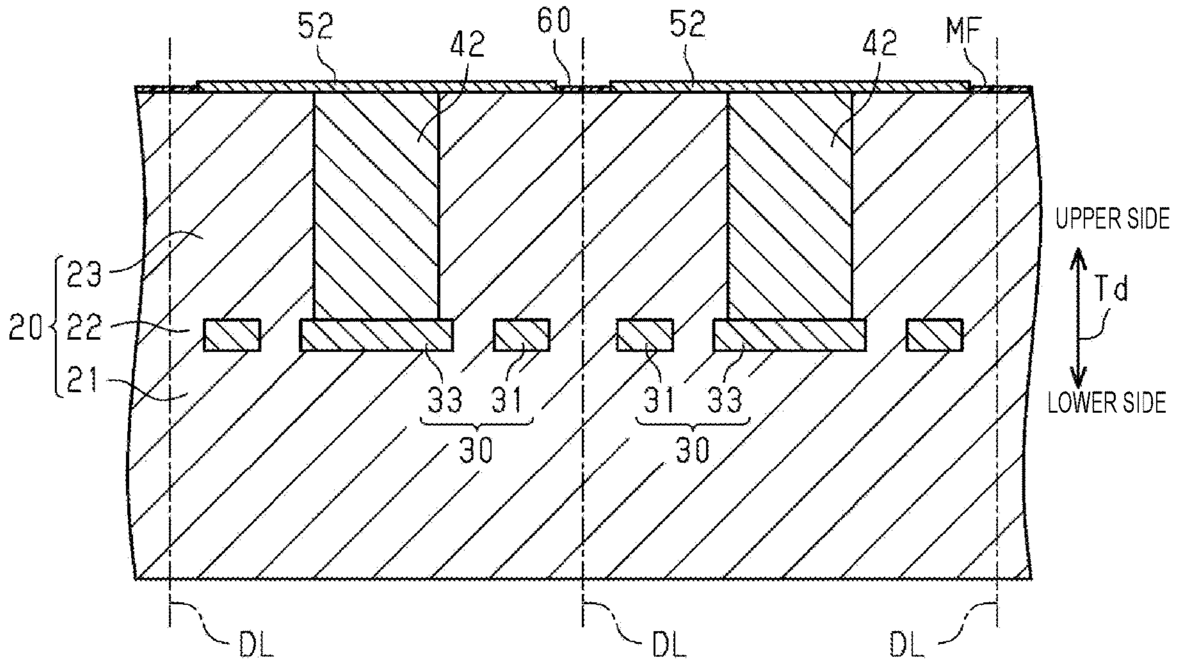
FIG. 14 is an explanatory diagram of the manufacturing method for the inductor component according to the first embodiment.

Next, an individualizing work process is performed as illustrated in FIG. 14. Specifically, individualizing is performed by dicing along the break lines DL. As a result, the inductor components 10 can be obtained.

Next, the operation and effects of the inductor component 10 according to the first embodiment described above will be described.

(1-1) According to the first embodiment described above, the dimension in the thickness direction Td of the penetration portion PP of the first vertical wiring 41 is about 7.3 times the maximum dimension TI in the thickness direction Td of the inductor wiring 30. That is, the dimension in the thickness direction Td of the penetration portion PP of the first vertical wiring 41 is about five times or more the maximum dimension TI in the thickness direction Td of the inductor wiring 30. Accordingly, the dimension in the thickness direction Td of the first vertical wiring 41 has a reasonable size as compared with the dimension in the thickness direction Td of the inductor wiring 30. By actively configuring the first vertical wiring 41 as the wiring that contributes to inductance as described above by increasing the dimension in the thickness direction Td of the first vertical wiring 41, the improvement of inductance can be achieved. Meanwhile, since the first vertical wiring 41 has a substantially columnar shape extending in the thickness direction Td and not in parallel to the main surface MF of the base body BD, it is possible to suppress the volume of the upper magnetic layer 23 from becoming excessively small due to the presence of the first vertical wiring 41. As a result, it is possible to suppress the occurrence of a situation in which an expected inductance cannot be obtained due to reduction in the volume of the upper magnetic layer 23.

In addition, the base body BD has the magnetic layer 20. The dimension in the thickness direction Td of the upper magnetic layer 23 that is penetrated by the penetration portion PP of the first vertical wiring 41 of the magnetic layer 20 is also about five times or more the dimension in the thickness direction Td of the inductor wiring 30. Accordingly, the inductor wiring 30 is covered with the reasonably thick upper magnetic layer 23 from the upper side in the thickness direction Td. Accordingly, since the magnetic flux generated when a current flows through the inductor wiring 30 is shielded by the upper magnetic layer 23, the amount of magnetic flux emitted outside the inductor component 10 can be reduced.

(1-2) According to the first embodiment described above, the ratio of the dimension in the thickness direction Td of the penetration portion PP of the first vertical wiring 41 to the diameter D1, which is the width dimension in the direction orthogonal to the thickness direction Td of the first vertical wiring 41, is about 2.2. The dimension TV1 in the thickness direction Td of the first vertical wiring 41 is about 220 μm. Accordingly, the first vertical wiring 41 extends in the thickness direction Td reasonably long. The inductance can be improved by ensuring the wiring length of the first vertical wiring 41 as described above.

(1-3) According to the first embodiment described above, the dimension in the thickness direction Td of the penetration portion PP of the first vertical wiring 41 is about 7.3 times the maximum dimension TI in the thickness direction Td of the inductor wiring 30. Similarly, the dimension in the thickness direction Td of the penetration portion PP of the second vertical wiring 42 is about 7.3 times the maximum dimension TI in the thickness direction Td of the inductor wiring 30. That is, the dimension in the thickness direction Td of the penetration portion PP of each of the vertical wirings is about seven times or more the maximum dimension TI in the thickness direction Td of the inductor wiring 30. By increasing the dimension in the thickness direction Td of each of the vertical wirings as described above, the dimension in the thickness direction Td of the upper magnetic layer 23 penetrated by each of the vertical wirings also becomes larger. As a result, the dimension in the thickness direction Td of the upper magnetic layer 23 becomes reasonably large with respect to the maximum dimension TI in the thickness direction Td of the inductor wiring 30 and the amount of the upper magnetic layer 23 can be ensured.

(1-4) According to the first embodiment described above, the maximum dimension TI in the thickness direction Td of the inductor wiring 30 is about 30 μm. In addition, the portion of the second layer L2 excluding the inductor wiring 30 is the intermediate magnetic layer 22. Accordingly, the maximum dimension in the thickness direction Td of the intermediate magnetic layer 22 matches the maximum dimension TI in the thickness direction Td of the inductor wiring 30. Since the maximum dimension TI in the thickness direction Td of the inductor wiring 30 is not less than about 10 μm, the DC electric resistance can be reduced reasonably. Furthermore, the intermediate magnetic layer 22 of a reasonable amount can be ensured. In contrast, since the maximum dimension TI in the thickness direction Td of the inductor wiring 30 is not more than about 50 μm, it is possible to suppress the ratio of the volume of the magnetic layer 20 to the inductor component 10 from being reduced due to the volume of the inductor wiring 30 becoming excessively large.

(1-5) According to the first embodiment described above, the dimension TBD in the thickness direction Td of the base body BD is about 475 μm, which is not more than about 500 μm. As described above, in the inductor component 10 with a comparatively small size, it is easier to obtain a high inductance because the thickness of the magnetic layer 20 of the outer magnetic path can be ensured by ensuring the dimensions in the thickness direction Td of the first vertical wiring 41 and the second vertical wiring 42 than by laminating the plurality of inductor wirings 30 in the thickness direction Td.

(1-6) According to the first embodiment described above, the first vertical wiring 41 contains not less than about 99 wt % of copper. Accordingly, since the ratio of copper composition in the first vertical wiring 41 is high, the DC current resistance of the first vertical wiring 41 can be made low reasonably. This is also true of the second vertical wiring 42.

Second Embodiment

An inductor component according to a second embodiment will be described below.

Figure 15:
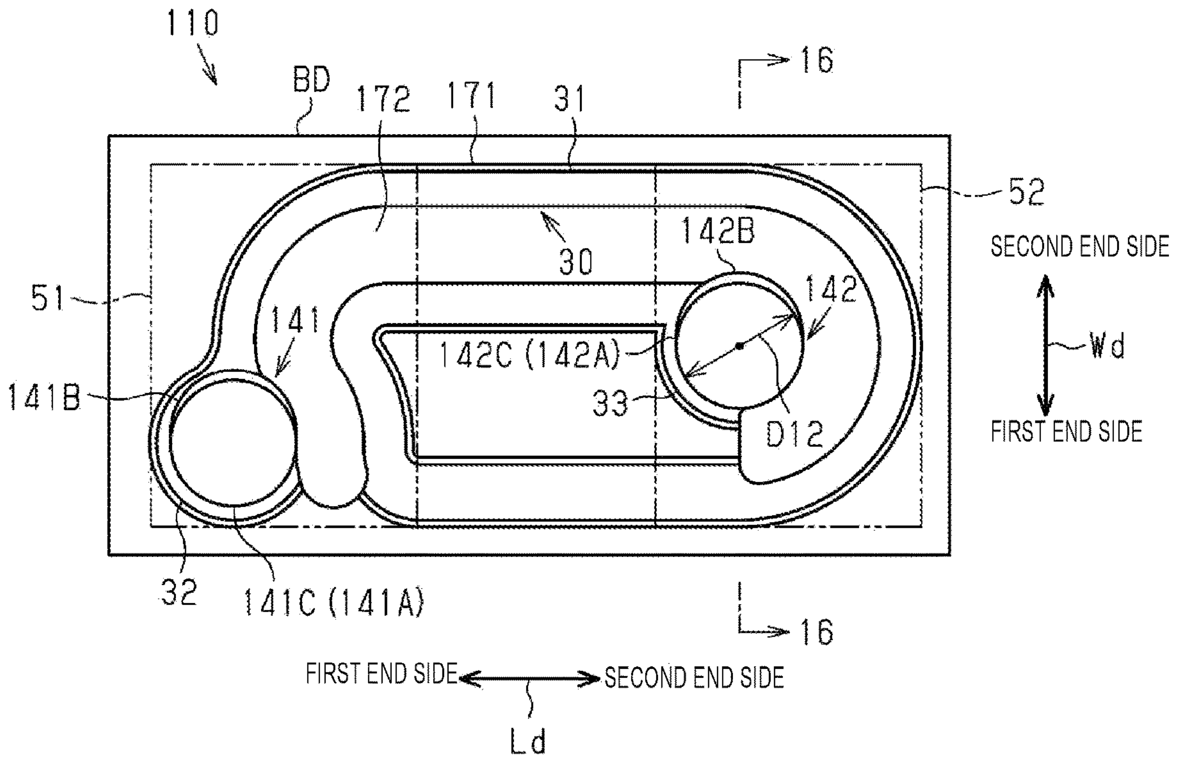
FIG. 15 is a transparent plan view of an inductor component according to a second embodiment.

An inductor component 110 according to the second embodiment mainly differs from the inductor component 10 according to the first embodiment described above in that the inductor component 110 has a first insulating portion 171 and a second insulating portion 172 and in that a first vertical wiring 141 and a second vertical wiring 142 have different structures, as illustrated in FIG. 15.

Figure 16:
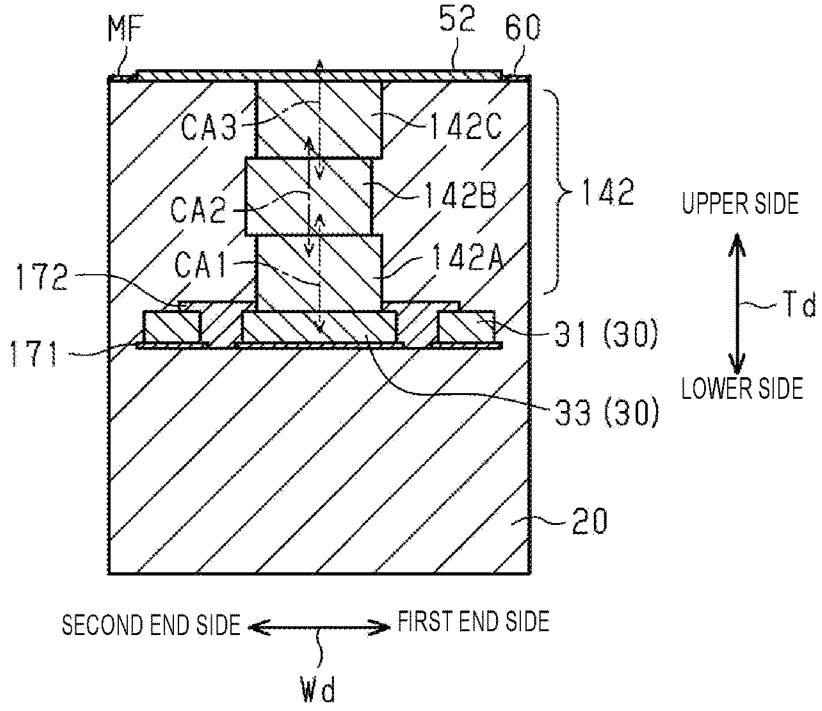
FIG. 16 is a sectional view of the inductor component taken along line 16-16 in FIG. 15.

As illustrated in FIG. 16, the lower surface, which is the surface on the lower side in the thickness direction Td of the inductor wiring 30, is covered with the first insulating portion 171. The first insulating portion 171 is made of a non-magnetic material, which is higher in insulation than the magnetic layer 20 and the inductor wiring 30. The dimension in the thickness direction Td of the first insulating portion 171 is smaller than that of the inductor wiring 30.

As illustrated in FIG. 15, the first insulating portion 171 is shaped so as to cover an area slightly wider than the outer edge of the inductor wiring 30 when viewed in the thickness direction Td. That is, the first insulating portion 171 as a whole extends clockwise substantially spirally around the vicinity of the center of the base body BD when viewed from the upper side in the thickness direction Td as in the inductor wiring 30.

Of the outer surfaces of the inductor wiring 30, the radially inner side of the portion from the first pad 32 to a point immediately before 0.75 turns of the wiring body 31 and the radially outer side of the portion from the second pad 33 to 0.5 turns of the wiring body 31 are covered with the second insulating portion 172. That is, the second insulating portion 172 is interposed in the portion in which the inter-wiring distance of the inductor wiring 30 is minimum.

Specifically, of the outer surfaces of the inductor wiring 30, the surface excluding the upper surface and lower surface is the side surface. Of the side surface of the inductor wiring 30, the second insulating portion 172 is interposed between part of the side surface on the radially inner side of the portion from the first pad 32 to a point immediately before 0.75 turns of the wiring body 31 and part of the side surface on the radially outer side of the portion from the second pad 33 to 0.5 turns of the wiring body 31.

In addition, the second insulating portion 172 covers, of the upper surface of the inductor wiring 30, the end portion on the radially inner side of the portion from the first pad 32 to a point immediately before 0.75 turns of the wiring body 31 and the end portion on the radially outer side of the portion from the second pad 33 to 0.5 turns of the wiring body 31.

As illustrated in FIG. 16, the lower surface in the thickness direction Td of the second insulating portion 172 is flush with the lower surface of the first insulating portion 171. The upper surface in the thickness direction Td of the second insulating portion 172 is disposed above the upper surface of the inductor wiring 30. Accordingly, the dimension in the thickness direction Td of the second insulating portion 172 is larger than that of the inductor wiring 30. The material of the second insulating portion 172 is a non-magnetic material, which is higher in insulation than the magnetic layer 20 and the inductor wiring 30.

In addition, as illustrated in FIGS. 15 and 16, in the inductor component 110 according to the second embodiment, the structures of the first vertical wiring 141 and the second vertical wiring 142 are different from those of the first vertical wiring 41 and the second vertical wiring 42 according to the first embodiment. Specifically, the first vertical wiring 141 includes a first columnar portion 141A, a second columnar portion 141B, and a third columnar portion 141C. The second vertical wiring 142 includes a first columnar portion 142A, a second columnar portion 142B and a third columnar portion 142C. In the following, the second vertical wiring 142 will be described and the first vertical wiring 141 will not be described because the structure of the first vertical wiring 141 is the same as that of the second vertical wiring 142.

As illustrated in FIG. 16, the first columnar portion 142A of the second vertical wiring 142 is directly connected to the upper surface of the second pad 33 of the inductor wiring 30. That is, the second vertical wiring 142 is connected to the second end of the inductor wiring 30. The material of the first columnar portion 142A is a conductive material, which is the same as that of the inductor wiring 30 in the embodiment.

The first columnar portion 142A has a substantially cylindrical shape and the axial direction of the substantially cylindrical shape matches the thickness direction Td. As illustrated in FIG. 15, the diameter of the first columnar portion 142A, which is substantially circular when viewed in the thickness direction Td, is slightly smaller than the diameter of the substantially circular second pad 33. In the embodiment, the diameter D12 of the first columnar portion 142A, which is substantially circular when viewed in the thickness direction Td, is about 100 μm. As illustrated in FIG. 16, the dimension in the thickness direction Td of the first columnar portion 142A is about 80 μm. In addition, the position of a central axis line CA1 extending in the thickness direction Td of the first columnar portion 142A matches the center of the second pad 33, which is substantially circular when viewed in the thickness direction Td.

The second columnar portion 142B of the second vertical wiring 142 is directly connected to the upper surface of the first columnar portion 142A. The material of the second columnar portion 142B is the same as that of the first columnar portion 142A.

The second columnar portion 142B has a substantially cylindrical shape and the axial direction of the substantially cylindrical shape matches the thickness direction Td. The diameter of the second columnar portion 142B, which is substantially circular when viewed in the thickness direction Td, is about 100 μm, which is the same as that of the first columnar portion 142A. In addition, the dimension in the thickness direction Td of the second columnar portion 142B is about 80 μm. The position of the central axis line CA2 extending in the thickness direction Td of the second columnar portion 142B deviates toward the second end in the lateral direction Wd from the central axis line CA1 of the first columnar portion 142A. Accordingly, the central axis line CA2 of the second columnar portion 142B and the central axis line CA1 of the first columnar portion 142A are not present on the same straight line. It should be noted that the amount of deviation between the central axis line CA2 of the second columnar portion 142B and the central axis line CA1 of the first columnar portion 142A is exaggerated in FIG. 16.

The third columnar portion 142C of the second vertical wiring 142 is directly connected to the upper surface of the second columnar portion 142B. The material of the third columnar portion 142C is the same as that of the second columnar portion 142B.

The third columnar portion 142C has a substantially cylindrical shape and the axial direction of the substantially cylindrical shape matches the thickness direction Td. The diameter of the third columnar portion 142C, which is substantially circular when viewed in the thickness direction Td, is about 100 μm, which is the same as that of the second columnar portion 142B. The dimension in the thickness direction Td of the third columnar portion 142C is about 60 μm. In addition, the central axis line CA3 extending in the thickness direction Td of the third columnar portion 142C and the central axis line CA1 of the first columnar portion 142A are present on the same straight line. Accordingly, the position of the central axis line CA3 of the third columnar portion 142C deviates toward the first end in the lateral direction Wd from the central axis line CA2 of the second columnar portion 142B.

Next, the manufacturing method for the inductor component 110 according to the second embodiment will be described.

Figure 17:
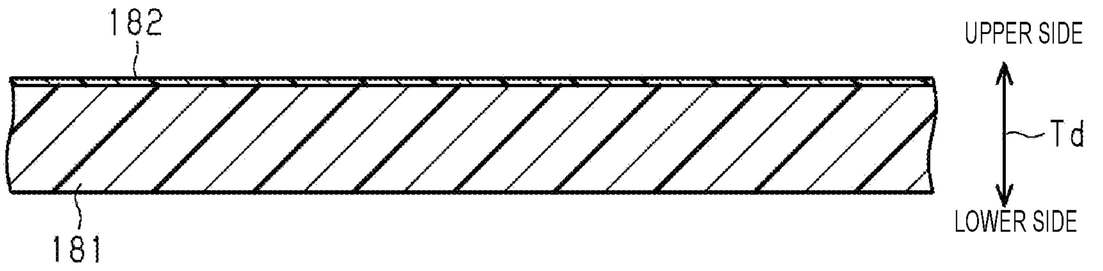
FIG. 17 is an explanatory diagram of a manufacturing method for the inductor component according to the second embodiment.

The base member preparation process is first performed as illustrated in FIG. 17. Specifically, a plate-like base member 181 is prepared. The material of the base member 181 is ceramic. The base member 181 is substantially quadrangular when viewed in the thickness direction Td and the dimensions of the sides are large enough to accommodate a plurality of inductor components 110.

Figure 18:
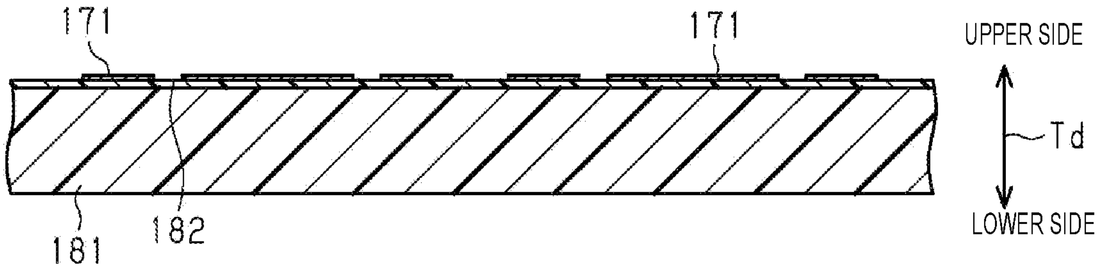
FIG. 18 is an explanatory diagram of the manufacturing method for the inductor component according to the second embodiment.

Next, a dummy insulating layer 182 is applied to the entire upper surface of the base member 181. Next, as illustrated in FIG. 18, an insulating resin that functions as the first insulating portion 171 is patterned by photolithography in a range slightly wider than the range in which the inductor wiring 30 is disposed when viewed from the upper side in the thickness direction Td.

Figure 19:
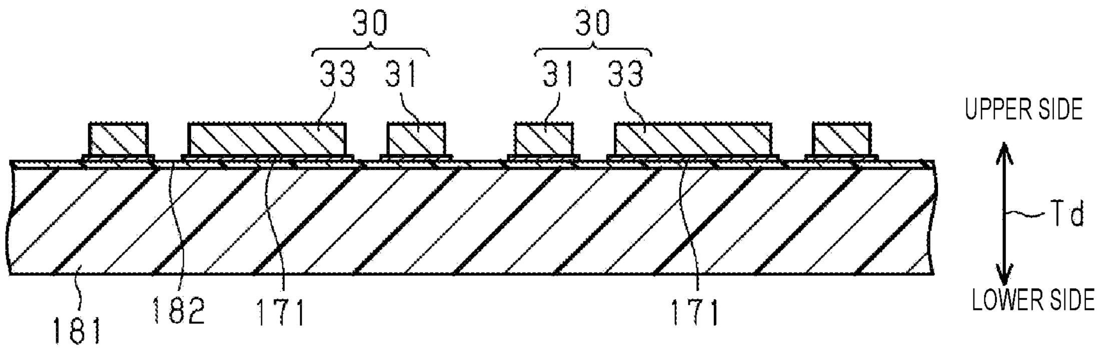
FIG. 19 is an explanatory diagram of the manufacturing method for the inductor component according to the second embodiment.

Next, as illustrated in FIG. 19, the inductor wiring 30 is formed by SAP as in the first embodiment described above. Specifically, as in the first embodiment, the seed layer forming process, the covering process, the inductor wiring work process, the covering portion removal process, and the seed layer etching process are performed.

Figure 20:
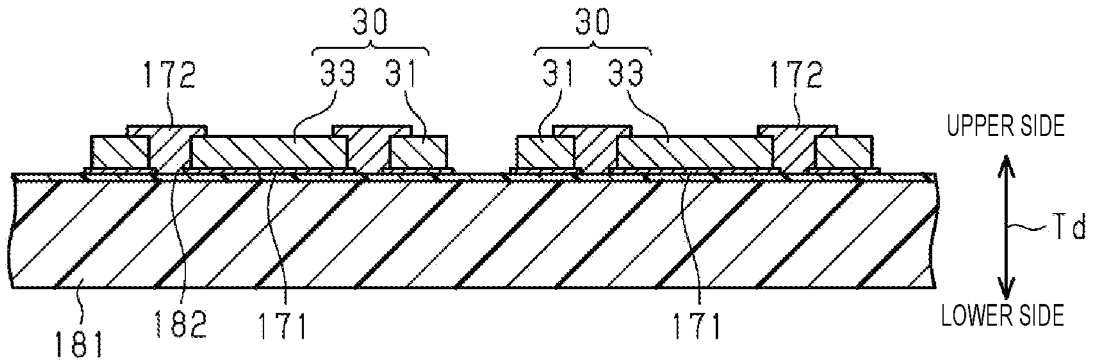
FIG. 20 is an explanatory diagram of the manufacturing method for the inductor component according to the second embodiment.

Next, the second insulating portion 172 is formed as illustrated in FIG. 20. Specifically, the insulating resin is applied from the upper side of the inductor wiring 30 so as to cover the entire inductor wiring 30. Next, the portion in which the second insulating portion 172 is to be formed is exposed. After that, the unsolidified portion of the applied insulating resin is peeled off and removed with a chemical solution. As a result, the exposed portion of the applied insulating resin is solidified to form the second insulating portion 172.

Next, the first vertical wiring 141 and the second vertical wiring 142 are formed as a vertical wiring process. In the second embodiment, the first vertical wiring 141 and the second vertical wiring 142 are formed by three covering processes and three plating processes. In the following description, only the second vertical wiring 142 is illustrated.

Figure 21:
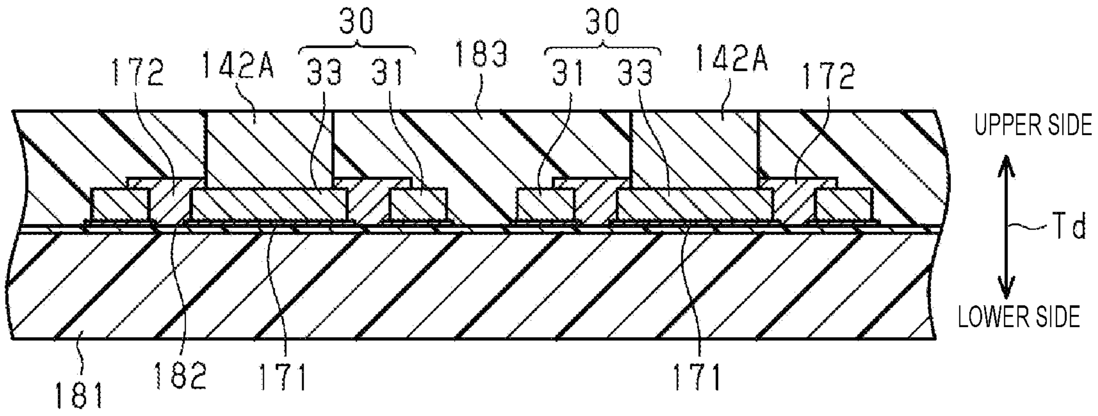
FIG. 21 is an explanatory diagram of the manufacturing method for the inductor component according to the second embodiment.

First, a first covering process is performed to form, from the upper side of the base member 181, a first covering portion 183 in the portion in which the first columnar portion 142A is not to be formed, as illustrated in FIG. 21. Next, a first plating process is performed to form the first columnar portion 142A by copper plating in the portion in which the first covering portion 183 has not been formed. Specifically, the first columnar portion 142A is formed so as to reach the same height as the upper surface of the first covering portion 183. In the embodiment, the dimension in the thickness direction Td of the first columnar portion 142A formed in the first plating process is about 80 μm.

Figure 22:
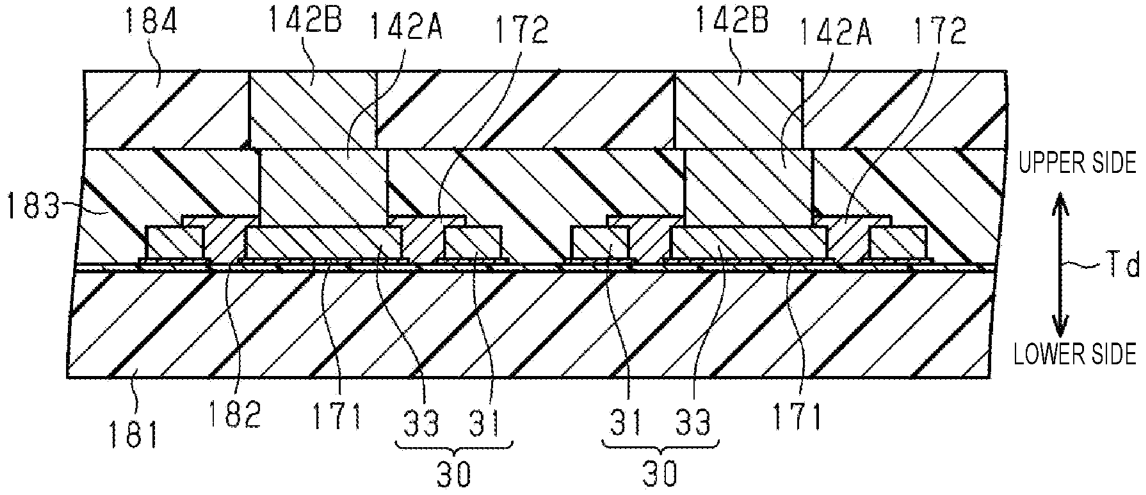
FIG. 22 is an explanatory diagram of the manufacturing method for the inductor component according to the second embodiment.

Next, a second covering process is performed to form, from the upper side of the first covering portion 183, a second covering portion 184 in the portion in which the second columnar portion 142B is not to be formed, as illustrated in FIG. 22. Next, a second plating process is performed to form the second columnar portion 142B by copper plating in the portion in which the second covering portion 184 has not been formed. Specifically, the second columnar portion 142B is formed so as to reach the same height as the upper surface of the second covering portion 184. In the embodiment, the dimension in the thickness direction Td of the second columnar portion 142B formed in the second plating process is about 80 μm.

Next, a third covering process is performed to form, from the upper side of the second covering portion 184, a third covering portion in the portion in which the third columnar portion 142C is not to be formed, which is not illustrated. In the embodiment, the third covering portion is formed in the same area as the first covering portion 183 when viewed in the thickness direction Td. Next, a third plating process is performed to form the third columnar portion 142C by copper plating in the portion in which the third covering portion has not been formed. Specifically, the third columnar portion 142C is formed so as to reach the same height as the upper surface of the third covering portion. In the embodiment, the dimension in the thickness direction Td of the third columnar portion 142C formed in the third plating process is about 80 μm.

Figure 23:
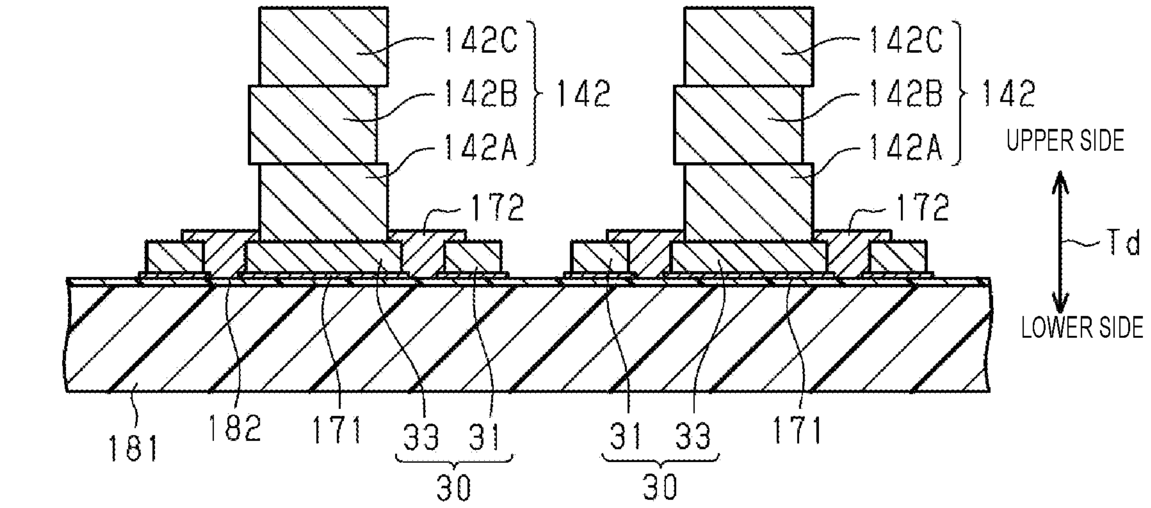
FIG. 23 is an explanatory diagram of the manufacturing method for the inductor component according to the second embodiment.

Next, the covering portion removal process is performed to remove the entire covering portion as illustrated in FIG. 23. Specifically, part of the first covering portion 183 is physically grasped and the entire covering portion is peeled off from the base member 181 so that they are separated from each other.

Figure 24:
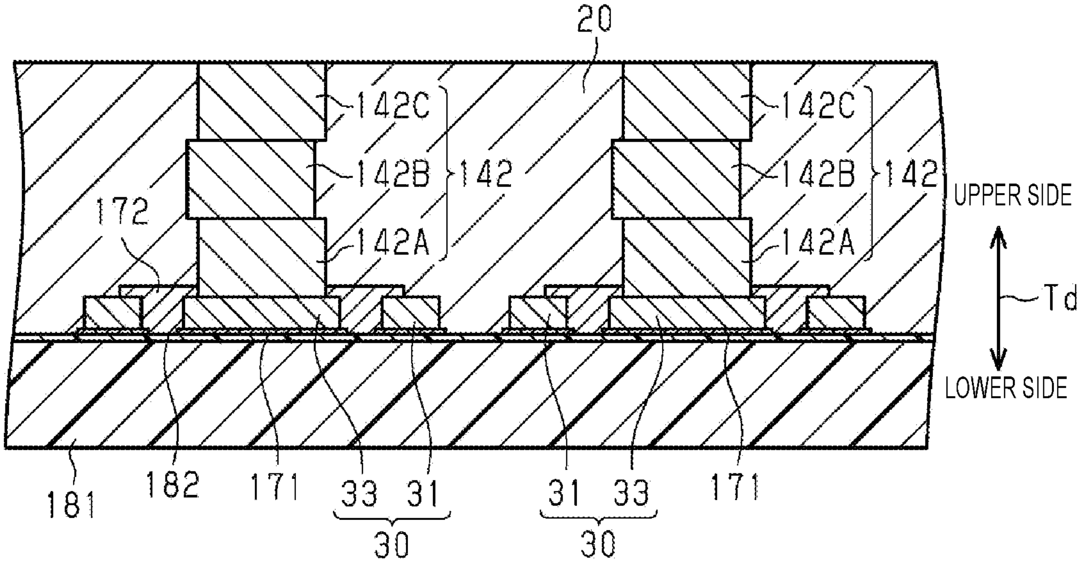
FIG. 24 is an explanatory diagram of the manufacturing method for the inductor component according to the second embodiment.

Next, a first magnetic layer work process is performed to perform lamination above the lower surface of the first insulating portion 171 of the magnetic layer 20, as illustrated in FIG. 24. Specifically, a resin containing magnetic powder, which is the material of the magnetic layer 20, is first applied from the upper side of the inductor wiring 30. At this time, the resin containing magnetic powder is applied so as to cover not only the surface of the inductor wiring 30, but also the range of the base member 181 that is not covered with any other member. Next, the portion of the magnetic layer 20 that is located above the lower surface of the first insulating portion 171 is formed by solidifying the resin containing the magnetic powder using press work. Then, the magnetic layer 20 and the third columnar portion 142C are ground from the upper side so that the dimensions in the thickness direction Td of the portion of the magnetic layer 20 that is located above the lower surface of the first insulating portion 171 and the vertical wirings become desired dimensions.

Figure 25:
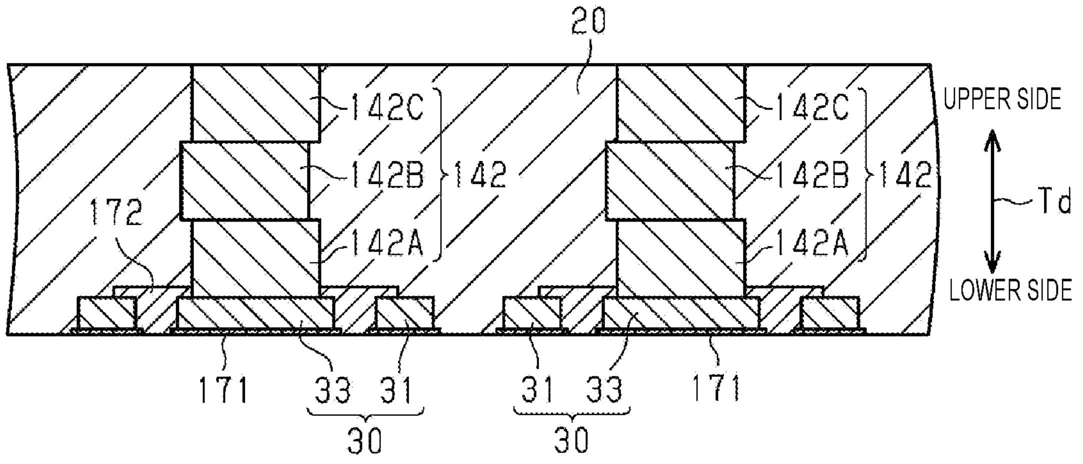
FIG. 25 is an explanatory diagram of the manufacturing method for the inductor component according to the second embodiment.

Next, the base member removal process is performed. Specifically, the base member 181 is shaved from the lower side until the first insulating portion 171 is exposed as illustrated in FIG. 25. This removes the base member 181.

Figure 26:
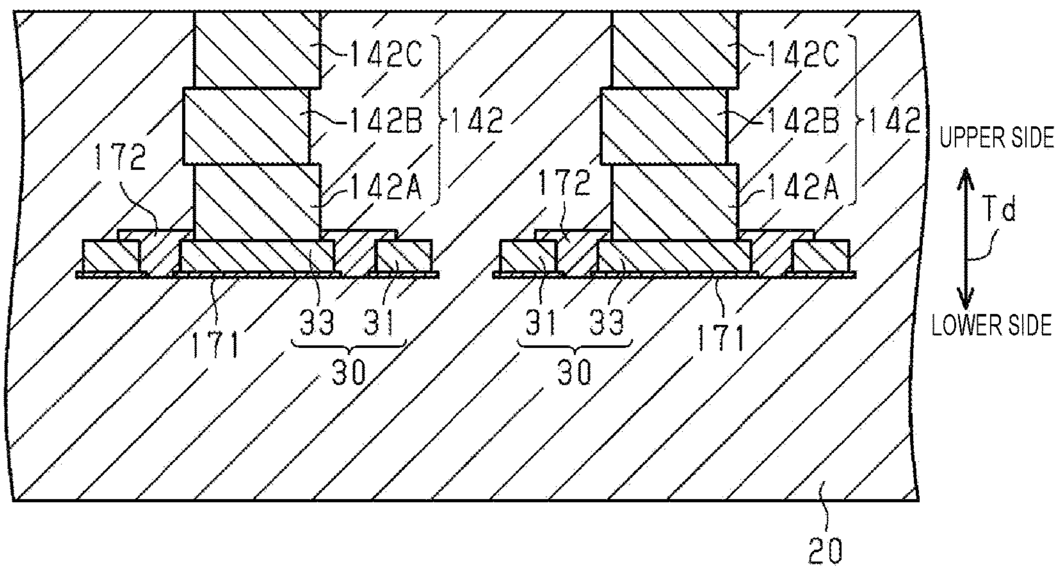
FIG. 26 is an explanatory diagram of the manufacturing method for the inductor component according to the second embodiment.

Next, the second magnetic layer work process is performed to perform lamination below the lower surface of the first insulating portion 171 of the magnetic layer 20, as illustrated in FIG. 26. Specifically, a resin containing magnetic powder, which is the material of the magnetic layer 20, is applied from the lower side of the first insulating portion 171. Next, the portion of the magnetic layer 20 that is located below the lower surface of the first insulating portion 171 is formed by solidifying the resin containing the magnetic powder using press work. Then, the magnetic layer 20 is ground from the lower side so that the dimension in the thickness direction Td of the portion of the magnetic layer 20 that is located below the lower surface of the first insulating portion 171 becomes a desired dimension.

Figure 27:
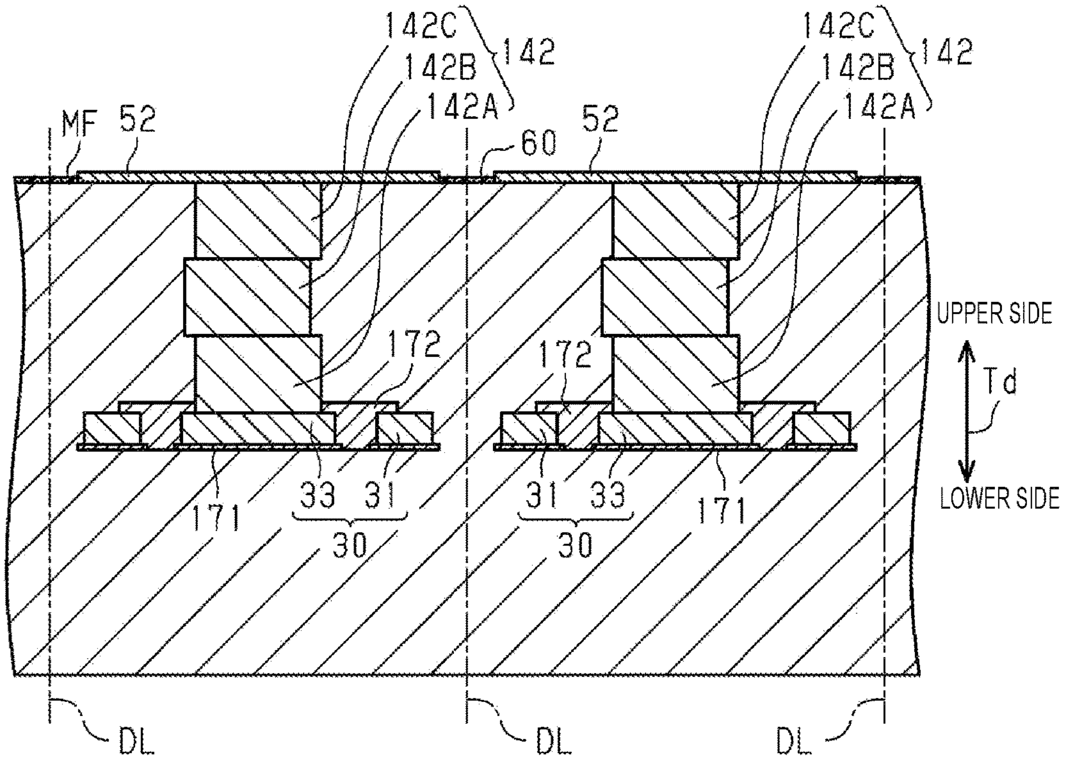
FIG. 27 is an explanatory diagram of the manufacturing method for the inductor component according to the second embodiment.

Next, the insulating layer work process is performed as illustrated in FIG. 27. Specifically, a solder resist that functions as the insulating layer 60 is patterned by photolithography in the portion of the upper surface of the upper magnetic layer 23 in which the external terminals are not to be formed. In the embodiment, the direction orthogonal to the upper surface of the insulating layer 60, that is, the main surface MF of the base body BD, is the thickness direction Td.

Next, as the external terminal forming process, the first external terminal 51 is formed in the range including the upper surface of the first vertical wiring 141, and the second external terminal 52 is formed in the range including the upper surface of the second vertical wiring 142. The first external terminal 51 and the second external terminal 52 are formed by electroless plating for copper, nickel, and gold. This forms the external terminals with a three-layer structure. It should be noted that FIG. 27 illustrates the second external terminal 52 and does not illustrate the first external terminal 51.

Next, the individualizing work process is performed. Specifically, individualizing is performed by dicing along the break lines DL. As a result, the inductor component 110 can be obtained.

Next, the operation and effects of the inductor component 110 according to the second embodiment described above will be described. In the inductor component 110 according to the second embodiment, the following effects are obtained in addition to the effects (1-1) to (1-6) of the inductor component 10 according to the first embodiment described above.

(2-1) According to the second embodiment described above, the second vertical wiring 142 includes the first columnar portion 142A, the second columnar portion 142B, and the third columnar portion 142C. Accordingly, the dimension in the thickness direction Td can be easily increased by forming the second vertical wiring 142 through a plurality of processes. This is also true of the first vertical wiring 141.

(2-2) According to the second embodiment described above, the three columnar portions constituting the second vertical wiring 142 have a substantially cylindrical shape and the axial direction of the substantially cylindrical shape matches the thickness direction Td. In addition, the central axis line CA2 of the second columnar portion 142B and the central axis line CA1 of the first columnar portion 142A are not present on the same straight line. Accordingly, the region in which the second vertical wiring 142 is present can be distributed as compared with the case in which the central axis line CA2 matches the central axis line CA1. Accordingly, the shrinkage ratio of the base body BD can be adjusted and the occurrence of unevenness and warpage on the upper surface and the lower surface of the base body BD can be reduced. In addition, since the contact area between the magnetic layer 20 and the second vertical wiring 142 is increased, the closeness between the magnetic layer 20 and the second vertical wiring 142 is improved. This is also true of the first vertical wiring 141.

(2-3) According to the second embodiment described above, the diameters of the three columnar portions constituting the second vertical wiring 142 are identical. That is, the maximum dimensions in the direction parallel to the main surface MF of the three columnar portions are identical. Accordingly, in the covering processes that form the three columnar portions, the settings of the sizes of the ranges in which each of the columnar portions is not to be formed can be the same setting. In particular, in the second embodiment described above, the sectional areas of the second vertical wiring 142 in the direction orthogonal to the thickness direction Td are identical. Accordingly, the current flowing through the second vertical wiring 142 can be suppressed from becoming less likely to flow partially. This is also true of the first vertical wiring 141.

(2-4) According to the second embodiment described above, the three columnar portions constituting the second vertical wiring 142 are in direct contact with each other. Accordingly, when the second vertical wiring 142 is configured by a plurality of columnar portions, a via or the like for connecting these columnar portions is not necessary. This is also true of the first vertical wiring 141.

(2-5) According to the second embodiment described above, the lower surface of the inductor wiring 30 is covered with the first insulating portion 171. Accordingly, the insulation of the lower side of the inductor wiring 30 can be ensured.

(2-6) According to the second embodiment described above, the second insulating portion 172 is interposed in the gap between the inductor wirings 30 running in parallel. Accordingly, the insulation between the inductor wirings 30 can be ensured.

The embodiments described above can be modified and implemented as described below. The embodiments described above and the modifications described below can be combined and implemented within the scope in which technical contradiction does not occur.

Figure 28:
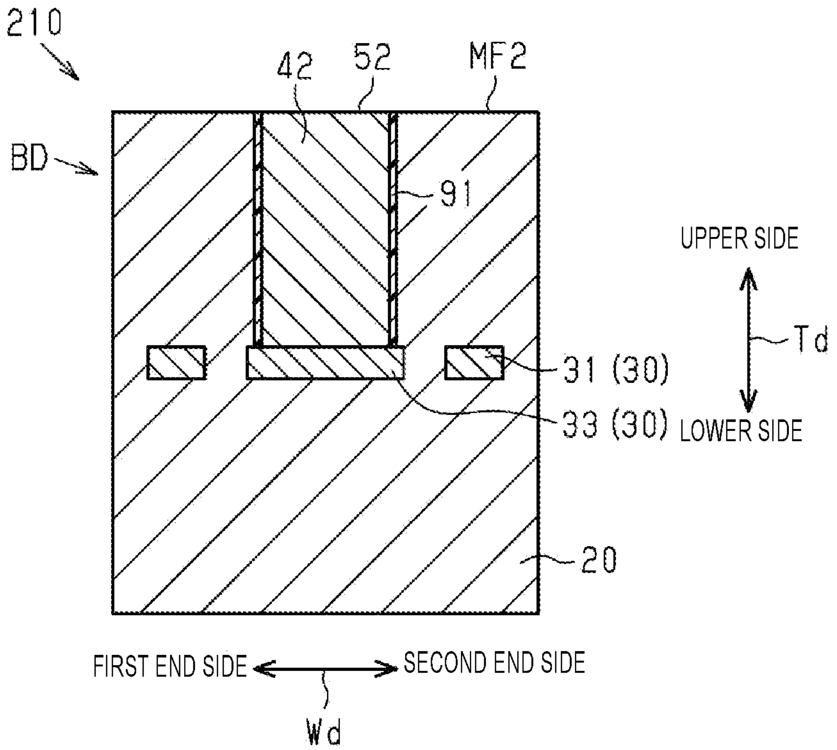
FIG. 28 is a sectional view of an inductor component according to a modification.

In the embodiments described above, when the surface of each of the vertical wirings that excludes the upper surface and the lower surface is assumed to be the side surface, the side surface of each of the vertical wirings does not need to make contact with the upper magnetic layer 23. In the inductor component 210 of the example illustrated in FIG. 28, an insulating film 91 is interposed between the side surface of the second vertical wiring 42 and the upper magnetic layer 23. The insulating film 91 is made of a material with a higher insulation than the second vertical wiring 42 and the upper magnetic layer 23. In addition, the insulating film 91 may be configured as part of the side surface of the metal columnar member MP. That is, a metal columnar member MP may be formed by covering the side surface of the columnar member made of a conductive material with the insulating film 91. In this case, the inductor component 210 can be formed by using the metal columnar member MP as in the first embodiment described above. In addition, in the inductor component 210, the insulation between the second vertical wiring 42 and the upper magnetic layer 23 can be ensured by providing the insulating film 91. It should be noted that the upper surface of the second vertical wiring 42 is the second external terminal 52 in the example illustrated in FIG. 28.

In the embodiments described above, the insulating layer 60 may be omitted. For example, in the example illustrated in FIG. 28, the insulating layer 60 in the first embodiment is omitted. In this example, the base body BD is configured by the magnetic layers 20. In this case, the upper surface of the magnetic layer 20 is the main surface MF2. As described above, the base body BD only needs to have a main surface through which the vertical wiring is exposed.

Figure 29:
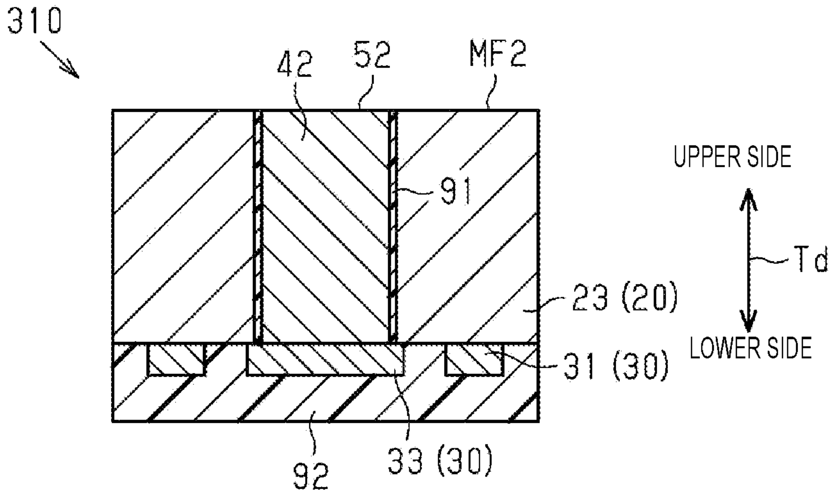
FIG. 29 is a sectional view of an inductor component according to a modification.

In the embodiments described above, layers made of a material other than the magnetic material may be adopted instead of the intermediate magnetic layer 22 and the lower magnetic layer 21. At least the upper magnetic layer 23 penetrated by the vertical wirings only need to be present. In the example illustrated in FIG. 29, in the inductor component 310, an insulating resin portion 92 covers the inductor wiring 30 from the lower side instead of the intermediate magnetic layer 22 and the lower magnetic layer 21 in the first embodiment. Specifically, the side surface and the lower surface of the inductor wiring 30 are covered with the insulating resin portion 92. The insulating resin portion 92 is made of a non-magnetic material and includes a material having a higher insulation than the upper magnetic layer 23. Accordingly, insulation below the inductor wiring 30 can be ensured.

For example, in the example illustrated in FIG. 31, a silicon substrate 93 is disposed below the inductor wiring 30 in the inductor component 510. As described above, the inductor wiring 30 may be disposed on the silicon substrate 93.

Figure 31:
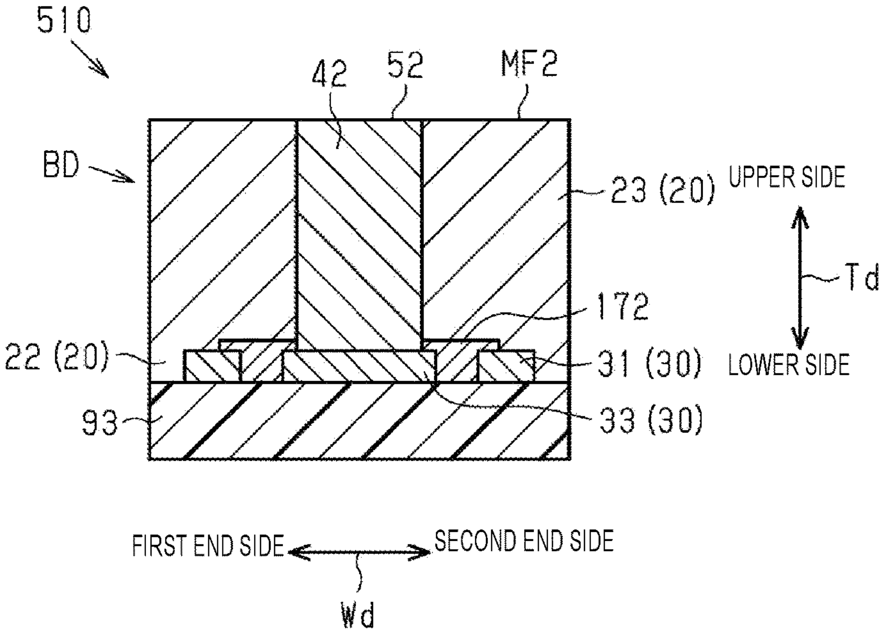
FIG. 31 is a sectional view of an inductor component according to a modification.

For example, in the example illustrated in FIG. 31, the second insulating portion 172 is interposed in the gap between the inductor wirings 30 in the portion in which the inductor wirings 30 extend in parallel to each other. In contrast, the first insulating portion 171 in the second embodiment is not provided. As described above, the second insulating portion 172 may be provided and the first insulating portion 171 may be omitted.

In the embodiments described above, the dimensions in the thickness direction Td of the first vertical wiring and the second vertical wiring do not need to match the dimension in the thickness direction Td of the upper magnetic layer 23. In addition, the upper surfaces of the vertical wirings do not need to be flush with the upper surface of the upper magnetic layer 23. At a minimum, the vertical wirings only need to penetrate the upper magnetic layer 23 and be exposed on the side of the main surface MF of the base body BD. Accordingly, even if the upper surfaces of the vertical wirings are located below the upper surface of the upper magnetic layer 23, it is sufficient that the upper surfaces of the vertical wirings are not completely covered with the upper magnetic layer 23 and are exposed through the main surface MF of the base body BD. When the upper surfaces of the vertical wirings are located above the upper surface of the upper magnetic layer 23, the portions of the vertical wirings below the upper surface of the upper magnetic layer 23 are the penetration portions PP.

In the embodiments described above, the shape of the inductor wiring 30 is not limited to the examples in the embodiments described above. For example, the number of turns of the inductor wiring 30 may be any number and the shape may be substantially a curve with 2.0 turns or more or substantially a straight line with 0 turns. In addition, for example, the inductor wiring 30 may have a substantially meander shape. In the example illustrated in FIG. 30, the inductor wiring 430 extends substantially wavily in the inductor component 410. The inductor wiring can give inductance to the inductor component by generating a magnetic flux in the magnetic layer 20 when a current flows, and only needs to extend in parallel to the main surface MF at a minimum.

In addition, for example, the cross section orthogonal to the extension direction of the inductor wiring 30 is not limited to substantially quadrilateral, and the cross section orthogonal to the extension direction of the inductor wiring 30 may be substantially circular or substantially polygonal. In addition, the surface of the inductor wiring 30 may be substantially curved.

In the embodiments described above, the shapes of the vertical wirings when viewed in the thickness direction Td are not limited to the examples in the embodiments described above. For example, the shapes of the vertical wirings when viewed in the thickness direction Td may be substantially elliptic or polygonal.

Figure 30:
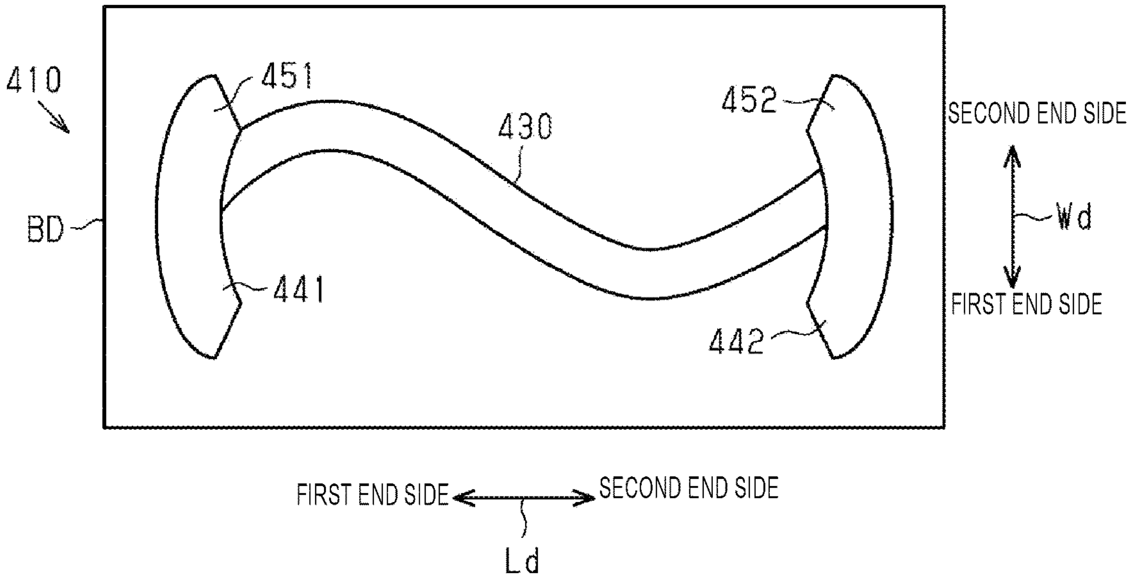
FIG. 30 is a transparent plan view of an inductor component according to a modification.

In the example illustrated in FIG. 30, in the inductor component 410, the shapes of the first vertical wiring 441 and the second vertical wiring 442 when viewed in the thickness direction Td are substantially curved strips. In the example illustrated in FIG. 30, a separate body such as a plated body is not formed, and the upper surface itself of the first vertical wiring 441 is exposed to the outside of the inductor component 410 as the first external terminal 451. Similarly, a separate body such as a plated body is not formed, and the upper surface itself of the second vertical wiring 442 is exposed to the outside of the inductor component 410 as the second external terminal 452.

Figure 32:
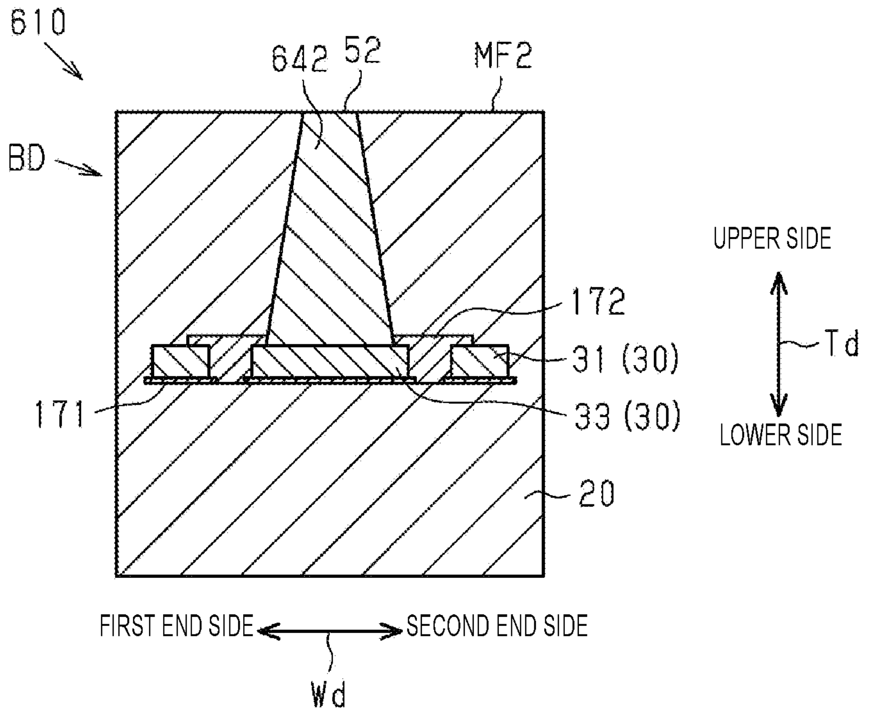
FIG. 32 is a sectional view of an inductor component according to a modification.

In the embodiments described above, the shapes of the vertical wirings may be substantially columnar and are not limited to the examples of the embodiments described above. In the example illustrated in FIG. 32, in the inductor component 610, the second vertical wiring 642 is shaped so that the diameter when viewed in the thickness direction Td is reduced toward the upper side in the thickness direction Td.

Figure 33:
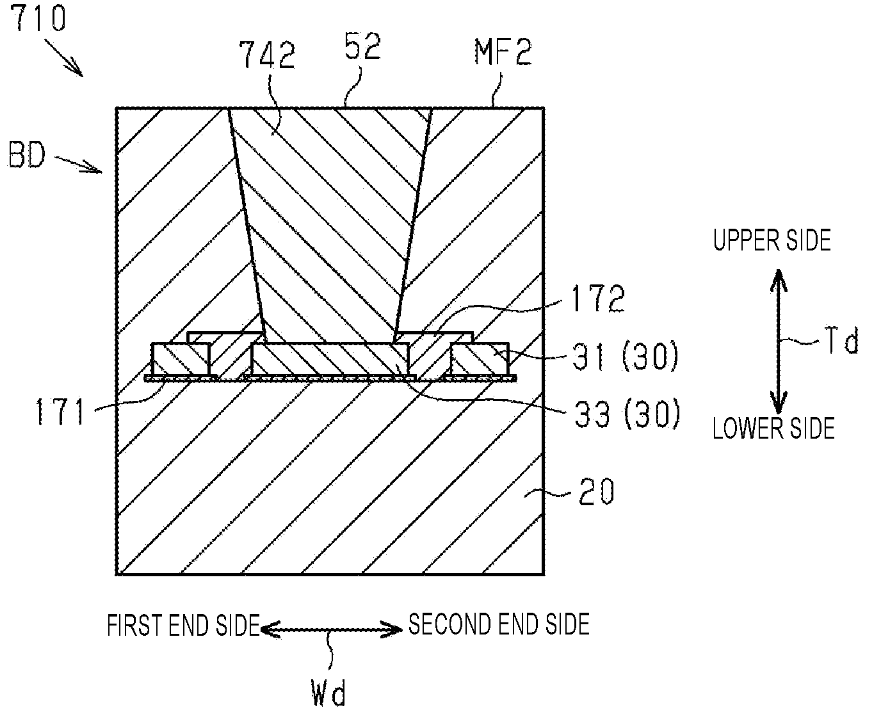
FIG. 33 is a sectional view of an inductor component according to a modification.

In the example illustrated in FIG. 33, in an inductor component 710, a second vertical wiring 742 is shaped so that the diameter when viewed in the thickness direction Td is increased toward the upper side in the thickness direction Td.

Figure 34:
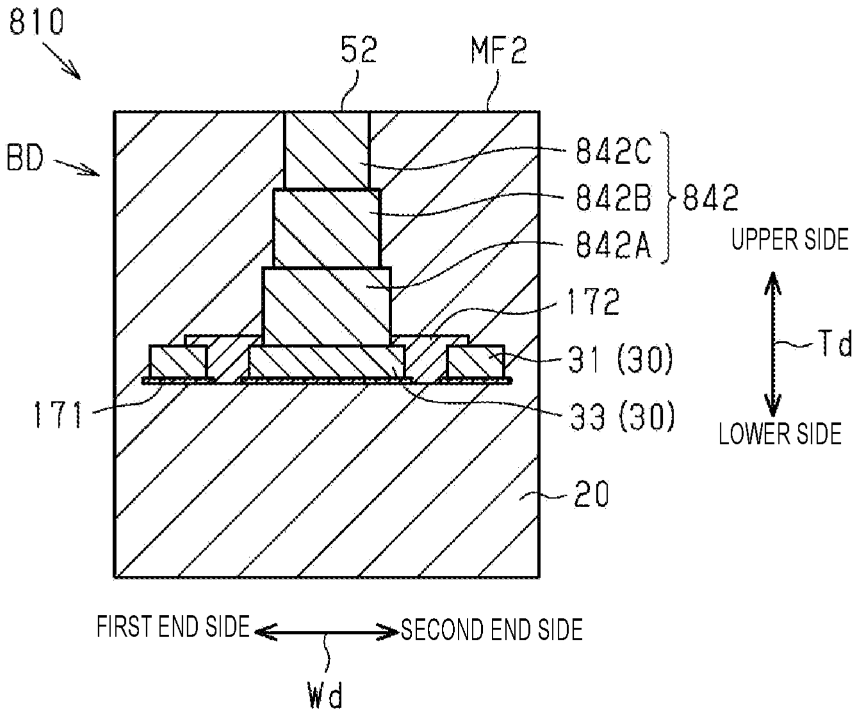
FIG. 34 is a sectional view of an inductor component according to a modification.

In the example illustrated in FIG. 34, a second vertical wiring 842 includes a first columnar portion 842A, a second columnar portion 842B, and a third columnar portion 842C in an inductor component 810. The first columnar portion 842A is substantially cylindrical. The second columnar portion 842B is connected to the upper surface of the first columnar portion 842A. The second columnar portion 842B is substantially cylindrical. The diameter of the second columnar portion 842B is smaller than the diameter of the first columnar portion 842A. The third columnar portion 842C is connected to the upper surface of the second columnar portion 842B. The third columnar portion 842C is substantially cylindrical. The diameter of the third columnar portion 842C is smaller than the diameter of the second columnar portion 842B. As described above, in the embodiments described above, each of the vertical wirings may include a plurality of substantially cylindrical columnar portions having different diameters. As a result, each of the vertical wirings may have a stepped side edge when viewed in a direction parallel to the main surface MF2.

Figure 35:
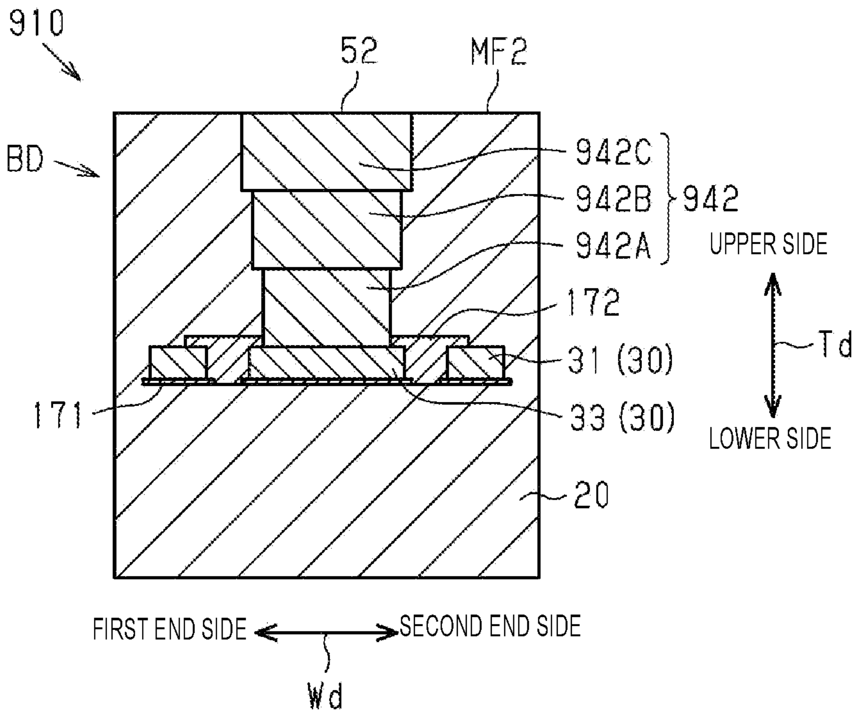
FIG. 35 is a sectional view of an inductor component according to a modification.

Furthermore, in the example illustrated in FIG. 35, a second vertical wiring 942 includes a first columnar portion 942A, a second columnar portion 942B, and a third columnar portion 942C in an inductor component 910. The first columnar portion 942A is substantially cylindrical. The second columnar portion 942B is connected to the upper surface of the first columnar portion 942A. The second columnar portion 942B is substantially cylindrical. The diameter of the second columnar portion 942B is larger than the diameter of the first columnar portion 942A. The third columnar portion 942C is connected to the upper surface of the second columnar portion 942B. The third columnar portion 942C is substantially cylindrical. The diameter of the third columnar portion 942C is larger than the diameter of the second columnar portion 942B. As described above, the magnetic layer 20 may have a stepped side edge in contact with the second vertical wiring 942 when viewed in a direction parallel to the main surface MF2.

In addition, in the example illustrated in FIG. 34, the diameter of the third columnar portion 842C may be larger than the diameter of the second columnar portion 842B. When the second vertical wiring 842 includes a plurality of columnar portions as described above, the diameters of the columnar portions may be smaller once from the lower side toward the upper side in the thickness direction Td and the diameters of the columnar portions may be larger toward the further upper side.

Furthermore, in the example illustrated in FIG. 35, the diameter of the third columnar portion 942C may be smaller than the diameter of the second columnar portion 942B. When the second vertical wiring 942 includes a plurality of columnar portions as described above, the diameters of the columnar portions may be larger once from the lower side toward the upper side in the thickness direction Td and the diameters of the columnar portions may be smaller toward the further upper side.

As in the examples illustrated in FIGS. 32 to 35, the vertical wirings may have substantially columnar shapes extending in the thickness direction Td while penetrating the upper magnetic layer 23. The substantially columnar shape is a shape in which not less than 1.0 turn is not wounded when viewed in a direction parallel to the main surface MF2. For example, in the modifications illustrated in FIGS. 34 and 35 described above, the columnar portions constituting the vertical wiring are directly connected and are not connected through vias for connecting the conductive layers of different layers.

In the embodiments described above, the dimension in the thickness direction Td of the penetration portion PP in each of the vertical wirings is not limited to the examples in the embodiments described above. Accordingly, the dimension in the thickness direction Td of the penetration portion PP may be less than about 100 μm.

In the first embodiment, the ratio of the dimension TV2 in the thickness direction Td of the penetration portion PP to the diameter D2 of the second vertical wiring 42 may be less than about 2.0. However, when the ratio of the dimension TV2 in the thickness direction Td of the penetration portion PP to the diameter D2 of the second vertical wiring 42 is not less than about 2.0, the dimension TV2 in the thickness direction Td of the second vertical wiring 42 is large, so the wiring length of the second vertical wiring 42 can be ensured, which is preferable from the viewpoint of improving the inductance. In addition, when the ratio of the dimension TV2 in the thickness direction Td of the penetration portion PP to the diameter D2 of the second vertical wiring 42 is not less than about 2.1, the wiring length of the second vertical wiring 42 can be further extended, which is preferable from the viewpoint of improving the inductance. This is also true of the second embodiment.

In the embodiments described above, the dimension in the thickness direction Td of the penetration portion PP may be less than about 7 times the maximum dimension TI in the thickness direction Td of the inductor wiring 30.

In the embodiments described above, the maximum dimension TI in the thickness direction Td of the inductor wiring 30 is not limited to the examples in the embodiments described above. Also, the maximum dimension TI in the thickness direction Td of the inductor wiring 30 may be less than about 10 μm or may be more than about 50 μm. The maximum dimension TI in the thickness direction Td of the inductor wiring 30 of not less than about 10 μm and not more than about 50 μm (i.e., from about 10 μm to about 50 μm) is desirable in terms of increasing the inductance.

When each of the vertical wirings includes a plurality of columnar portions, the number of columnar portions is not limited to the example in the second embodiment described above. For example, the first vertical wiring 141 may include two columnar portions or may include not less than four columnar portions. In addition, for example, all of the central axes of the plurality of columnar portions may be on the same straight line. In addition, for example, all of the dimensions in the thickness direction Td of the plurality of columnar portions may be the same or may be different from each other. Furthermore when, for example, the first vertical wiring includes three or more columnar portions, the maximum dimensions in the directions parallel to the main surfaces MF of at least two of the columnar portions may be the same dimension, and the maximum dimensions in the directions parallel to the main surfaces MF of the other one or more columnar portions may be different from each other.

The materials of the vertical wirings are not limited to the examples in the embodiments described above. For example, the materials of the vertical wirings may be different from the material of the inductor wiring 30. For example, the material of the inductor wiring and the materials of the vertical wirings may be any conductive material and may be copper, silver, gold, aluminum, or alloy containing these metals.

In the embodiments described above, the dimensions in the thickness direction Td of the lower magnetic layer 21, the intermediate magnetic layer 22, and the upper magnetic layer 23 are not limited to the examples in the embodiments described above. For example, in the first embodiment, when the dimension in the thickness direction Td of the lower magnetic layer 21 is not less than the dimension in the thickness direction Td of the upper magnetic layer 23, the inductor wiring 30 can be covered with a reasonable amount of the magnetic layer 20 in the thickness direction Td. As a result, noise from the inductor wiring 30 in the inductor component 10 can be suppressed from leaking outside the inductor component 10.

In the embodiments described above, the dimension TBD in the thickness direction Td of the base body BD is not limited to the examples in the embodiments described above. For example, in the first embodiment, the dimension TBD in the thickness direction Td of the base body BD may be more than about 500 μm. Even in this case, it is possible to suppress the volume of the upper magnetic layer 23 from becoming excessively small due to the presence of the vertical wirings.

In the embodiments described above, the layers that constitute the inductor component may be integrated with each other or configured as separate bodies. For example, in the first embodiment, an interface may be present between the first layer L1 and the second layer L2 and an interface may be present between the third layer L3 and the fourth layer L4 by integrating the second layer L2 and the third layer L3 with each other with no interface and configuring the first layer L1 and the fourth layer L4 as separate bodies.

In the embodiments described above, the inductance obtained from the inductor component when a small signal current at a frequency of 100 MHz flows from the first external terminal 51 to the second external terminal 52 through the first vertical wiring, the inductor wiring 30, and the second vertical wiring is desirably not less than about 1 nH and not more than about 10 nH (i.e., from about 1 nH to about 10 nH). The inductance is measured by the network analyzer E5071 (manufactured by Keysight) or an equivalent, the S (scattering) parameters at a measurement frequency of 100 MHz is measured via the shunt-through method, and the obtained value is converted to inductance value. However, the effects of jigs are removed by de-embedding and short-circuit correction. The inductor component expected to be used at high frequencies is preferable because the wiring length of the conductive portion including the single-layer inductor wiring 30 and the vertical wirings is sufficient to obtain the inductance in the range described above. In addition, the inductance described above can contribute to the improvement of the efficiency of a DC-DC converter when, for example, the inductor component is used as a component to be built into the DC-DC converter.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. An inductor component comprising:

a base body having a main surface;

an inductor wiring extending in parallel to the main surface in the base body;

a first vertical wiring connected to a first end of the inductor wiring, the first vertical wiring being exposed through the main surface; and a second vertical wiring connected to a second end of the inductor wiring, the second vertical wiring being exposed through the main surface, wherein the base body has a magnetic layer disposed closer to the main surface than the inductor wiring, the first vertical wiring and the second vertical wiring have columnar shapes extending in a thickness direction while penetrating the magnetic layer, the thickness direction being orthogonal to the main surface, a dimension in the thickness direction of a penetration portion is five times or more a maximum dimension in the thickness direction of the inductor wiring, the penetration portion being a portion of the first vertical wiring penetrating the magnetic layer, the first end of the inductor wiring is at an end of an outer winding of the inductor wiring, the second end of the inductor wiring is surrounded by the outer winding of the inductor wiring, a ratio of the dimension in the thickness direction of the penetration portion to a width dimension in a direction parallel to the main surface of the first vertical wiring is 2.0 or more, and a portion of the inductor wiring that passes a pad at the first end of the inductor wiring to which the first vertical wiring is attached has a curve that maintains a distance between the outer perimeter of the pad and an edge of the portion of the inductor wiring facing the pad.

2. The inductor component according to claim 1, wherein the dimension in the thickness direction of the penetration portion is 100 μm or more.

3. The inductor component according to claim 1, wherein the dimension in the thickness direction of the inductor wiring is from 10 μm to 50 μm.

4. The inductor component according to claim 1, wherein the first vertical wiring has a plurality of columnar portions arranged in the thickness direction, and central axes of the plurality of columnar portions extend in the thickness direction.

5. The inductor component according to claim 4, wherein the central axes of at least two columnar portions of the plurality of columnar portions are not present on the same straight line.

6. The inductor component according to claim 4, wherein maximum dimensions in the direction parallel to the main surface of the plurality of columnar portions are identical to each other.

7. The inductor component according to claim 4, wherein the columnar portions of the plurality of columnar portions are in direct contact with each other.

8. The inductor component according to claim 1, wherein a side surface of the first vertical wiring is covered with an insulating film with higher insulation than the magnetic layer, the side surface being an outer surface of the first vertical wiring excluding a portion of the outer surface in contact with the inductor wiring and a portion of the outer surface exposed through the main surface.

9. The inductor component according to claim 1, wherein the first vertical wiring contains not less than 99 wt % of copper.

10. The inductor component according to claim 1, wherein a ratio of the dimension in the thickness direction of the penetration portion to the width dimension in the direction parallel to the main surface of the first vertical wiring is 2.1 or more, and the dimension in the thickness direction of the penetration portion is seven times or more the maximum dimension in the thickness direction of the inductor wiring.

11. The inductor component according to claim 1, wherein a maximum dimension in the thickness direction of the base body is 500 μm or less.

12. The inductor component according to claim 1, wherein at least part of an outer surface of the inductor wiring is in contact with a non-magnetic material.

13. The inductor component according to claim 1, wherein an inductance when a small signal current at a frequency of 100 MHz flows through the inductor wiring is from 1 nH to 10 nH.

14. The inductor component according to claim 2, wherein the dimension in the thickness direction of the inductor wiring is from 10 μm to 50 μm.

15. The inductor component according to claim 2, wherein the first vertical wiring has a plurality of columnar portions arranged in the thickness direction, and central axes of the plurality of columnar portions extend in the thickness direction.

16. The inductor component according to claim 5, wherein maximum dimensions in the direction parallel to the main surface of the plurality of columnar portions are identical to each other.

17. The inductor component according to claim 5, wherein the columnar portions of the plurality of columnar portions are in direct contact with each other.

18. The inductor component according to claim 2, wherein a side surface of the first vertical wiring is covered with an insulating film with higher insulation than the magnetic layer, the side surface being an outer surface of the first vertical wiring excluding a portion of the outer surface in contact with the inductor wiring and a portion of the outer surface exposed through the main surface.

19. The inductor component according to claim 2, wherein the first vertical wiring contains not less than 99 wt % of copper.

20. The inductor component according to claim 2, wherein a ratio of the dimension in the thickness direction of the penetration portion to the width dimension in the direction parallel to the main surface of the first vertical wiring is 2.1 or more, and the dimension in the thickness direction of the penetration portion is seven times or more the maximum dimension in the thickness direction of the inductor wiring.

* * * * *